(12) United States Patent
Shimizu et al.

(10) Patent No.: US 8,066,090 B2
(45) Date of Patent: Nov. 29, 2011

(54) HYDRAULIC PRESSURE CONTROL DEVICE OF AN AUTOMATIC TRANSMISSION AND HYBRID DRIVE DEVICE HAVING THE HYDRAULIC PRESSURE CONTROL DEVICE

(75) Inventors: Tetsuya Shimizu, Anjo (JP); Kazuyuki Noda, Anjo (JP); Kazunori Ishikawa, Anjo (JP); Satoru Kasuya, Anjo (JP); Tooru Matsubara, Toyota (JP); Masahiro Kojima, Okazaki (JP); Ryuji Ibaraki, Nishikamo-gun (JP); Atsushi Tabata, Okazaki (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 1006 days.

(21) Appl. No.: 12/003,454

(22) Filed: Dec. 26, 2007

(65) Prior Publication Data
US 2008/0200301 A1    Aug. 21, 2008

(30) Foreign Application Priority Data
Dec. 26, 2006   (JP) ................................. 2006-350309

(51) Int. Cl.
F16H 61/4069    (2010.01)
(52) U.S. Cl. ......... 180/305; 477/127; 477/130; 475/133
(58) Field of Classification Search .................. 477/125, 477/126, 127, 130, 131, 143, 149; 475/128, 475/132, 133; 180/305, 307
See application file for complete search history.

(56) References Cited

U.S. PATENT DOCUMENTS

| | | | |
|---|---|---|---|
| 5,472,389 A * | 12/1995 | Ando et al. | 477/130 |
| 5,505,674 A * | 4/1996 | Furukawa et al. | 477/130 |
| 5,725,455 A | 3/1998 | Kamada et al. | |
| 5,779,585 A * | 7/1998 | Tsukamoto et al. | 475/128 |
| 5,800,308 A * | 9/1998 | Tsutsui et al. | 477/116 |
| 5,947,856 A * | 9/1999 | Tabata et al. | 475/128 |
| 5,997,436 A * | 12/1999 | Shibuya et al. | 477/154 |
| 6,264,580 B1 * | 7/2001 | Tabata et al. | 477/149 |
| 6,309,324 B1 * | 10/2001 | Sawa et al. | 477/125 |
| 6,364,801 B1 * | 4/2002 | Asatsuke et al. | 475/119 |
| 6,464,610 B1 * | 10/2002 | Hisano et al. | 475/119 |
| 6,475,113 B2 * | 11/2002 | Suzuki et al. | 477/127 |
| 6,569,050 B2 * | 5/2003 | Suzuki et al. | 475/122 |
| 6,634,991 B2 * | 10/2003 | Itou et al. | 477/156 |
| 6,729,988 B2 * | 5/2004 | Katou et al. | 475/128 |
| 6,736,755 B2 * | 5/2004 | Kato | 477/92 |
| 6,802,792 B2 * | 10/2004 | Fujimine et al. | 475/116 |

(Continued)

FOREIGN PATENT DOCUMENTS

JP    A 08-296733    11/1996

(Continued)

Primary Examiner — Jeffrey J Restifo
(74) Attorney, Agent, or Firm — Oliff & Berridge, PLC

(57) ABSTRACT

A hydraulic control apparatus for an automatic transmission includes a forward travel engaging element, a reverse travel engaging element, a first signal electromagnetic valve, a first switching valve, and a second switching valve. The hydraulic control apparatus is structured so as to change the output state of the signal pressure of the first signal electromagnetic valve when changing from the reverse travel shift position and/or shift range to the non-travel shift position and/or shift range and when changing from the forward travel shift position and/or shift range to the non-travel shift position and/or shift range, and to enable quick draining of hydraulic pressure of the hydraulic servo of the reverse travel engaging element and hydraulic pressure of the hydraulic servo of the forward travel engaging element.

19 Claims, 9 Drawing Sheets

U.S. PATENT DOCUMENTS

| | | | |
|---|---|---|---|
| 6,835,151 B2 * | 12/2004 | Fujimine et al. | 475/116 |
| 6,846,259 B2 * | 1/2005 | Fujimine et al. | 475/121 |
| 7,175,556 B2 * | 2/2007 | Morise et al. | 475/119 |
| 7,278,944 B2 * | 10/2007 | Morise et al. | 475/121 |
| 7,618,344 B2 * | 11/2009 | Hayashi et al. | 477/131 |
| 7,621,837 B2 * | 11/2009 | Sato et al. | 475/127 |
| 7,803,081 B2 * | 9/2010 | Watanabe et al. | 475/117 |
| 2002/0025886 A1 | 2/2002 | Itou et al. | |
| 2004/0067810 A1 | 4/2004 | Fujimine et al. | |
| 2005/0003921 A1 | 1/2005 | Morise et al. | |
| 2008/0200301 A1 * | 8/2008 | Shimizu et al. | 477/2 |

FOREIGN PATENT DOCUMENTS

| | | |
|---|---|---|
| JP | A 2001-343067 | 12/2001 |
| JP | A 2004-036673 | 2/2004 |
| JP | A 2004-197758 | 7/2004 |
| JP | A 2005-024083 | 1/2005 |

* cited by examiner

FIG.2

|  | C-1 | C-2 | C-3 | B-1 | B-2 | F-1 |
|---|---|---|---|---|---|---|
| P |  |  |  |  |  |  |
| R |  |  | ○ |  | ○ |  |
| N |  |  |  |  |  |  |
| 1ST | ○ |  |  |  | (○) | ○ |
| 2ND | ○ |  |  | ○ |  |  |
| 3RD | ○ | ○ |  |  |  |  |
| 4TH |  | ○ |  | ○ |  |  |

※(○) DENOTES BEING CARRIED OUT DURING ENGINE BRAKING

HYDRAULIC PRESSURE CONTROL DEVICE OF AN AUTOMATIC TRANSMISSION AND HYBRID DRIVE DEVICE HAVING THE HYDRAULIC PRESSURE CONTROL DEVICE

The disclosure of Japanese Patent Application No. 2006-350309 filed on Dec. 26, 2006 including the specification, drawings and abstract is incorporated herein by reference in its entirety.

BACKGROUND

The present invention relates to a hydraulic pressure control device of an automatic transmission and a hybrid drive device having the hydraulic pressure control device.

There exists a hydraulic control apparatus for an automatic transmission that is mounted in a vehicle such as an automobile or the like. In the hydraulic control apparatus, when a shift position and/or shift range is changed from a non-travel shift position and/or shift range (neutral position, parking position) to a travel shift position and/or shift range (drive position, reverse position) due to a shift lever operation by the driver, clutches and brakes are engaged by supplying engagement pressures to the hydraulic servos of the clutches and the brakes that are to be engaged. On the contrary, when changing from a travel shift position and/or shift range to a non-travel shift position and/or shift range, the disengagement of the clutches and brakes is carried out by discharging (draining) the engagement pressures of the hydraulic servos of the clutches and the brakes that are to be disengaged.

In such a hydraulic control apparatus, a valve is interposed on the oil paths that supply the engagement pressures for selectively guiding and regulating the original pressures, such as the line pressure and the range pressure. Normally, when these engagement pressures are discharged, the engagement pressures are drained via such valves by reversing the flow of the oil paths that supply the engagement pressures. However, problems occur, in particular, when the viscosity of the oil is high at low temperatures. The distance of the oil paths as described above becomes a resistance, the draining slows, the disengagement of the clutches and brakes is delayed, and there is a concern that travel torque will be transferred instantaneously (what is referred to as "residual engagement") even though the shift position and/or shift range is in a non-travel shift position and/or shift range.

Such a phenomenon is particularly undesirable in the reverse travel direction. Enabling the engagement pressure of the hydraulic servos of the engaging elements that are engaged in the reverse travel shift position and/or shift range to drain quickly has thus been proposed (refer, for example, to Japanese Patent Application Publication No. JP-A-2001-343067). Here, in oil paths that supply engagement pressures to the hydraulic servos, a switching valve (refer to reference numeral 61 in FIG. 5) is provided on the hydraulic servo side, and the oil path up to the hydraulic servo is communicated with a drain port by switching the switching valve by using the signal pressure of a solenoid valve (refer to reference numeral S4 in FIG. 5). The draining is more rapid than the draining via the oil path that supplies the engagement pressure, and thus a quick draining becomes possible.

SUMMARY

However, Japanese Patent Application Publication No. JP-A-2001-343067 discloses an example in which a quick draining of only the engaging elements that are engaged in the reverse travel shift position and/or shift range becomes possible. In particular, when an automatic transmission is used in a vehicle that includes a motor in the drive source, such as a hybrid vehicle or the like, because the rise of the torque output of the motor is fast in comparison to the torque output of the engine, quick draining of the engaging elements that are engaged in the forward travel shift position and/or shift range is also necessary in order to respond to the case in which, for example, the change from the forward travel shift position and/or shift range to the reverse travel shift position and/or shift range is rapid.

However, when a switching valve and a solenoid valve for quick draining (as described, for example, in the above proposal) are directly disposed on the oil path on the side of the engaging elements that are engaged in the forward travel shift position and/or shift range, two solenoid valves that output signal pressures for carrying out the quick draining are used. There is thus a concern in that the cost reduction of the hydraulic control apparatus is hindered. There is also a concern in that the timing adjustment of these two solenoid valves is difficult when, for example, the driver moves the shift lever quickly by repeatedly shifting from the reverse travel shift position and/or shift range to the forward travel shift position and/or shift range and from the forward travel shift position and/or shift range to the reverse travel shift position and/or shift range. There is also a concern in that instantaneous engagement will simultaneously occur and cause shift shock.

The present invention thus provides, among other things, a hydraulic control apparatus for an automatic transmission that enables cost reduction and prevents shift shock while enabling quick draining in the hydraulic servos of the engaging elements for forward travel and the hydraulic servos of the engaging elements for reverse travel, and a hybrid drive apparatus that is provided with the same.

According to an exemplary aspect of the invention, a hydraulic control apparatus for an automatic transmission includes a forward travel engaging element that engages when changing from a non-travel shift position and/or shift range to a forward travel shift position and/or shift range and disengages when changing from the forward travel shift position and/or shift range to the non-travel shift position and/or shift range; a reverse travel engaging element that engages when changing from the non-travel shift position and/or shift range to a reverse travel shift position and/or shift range and disengages when changing from the reverse travel shift position and/or shift range to the non-travel shift position and/or shift range; a first signal electromagnetic valve that can output a signal pressure; a first switching valve that is interposed on a reverse travel engagement oil path that supplies an engagement pressure to a hydraulic servo of the reverse travel engaging element, and that switches between an engagement position that communicates the reverse travel engagement oil path and a discharge position that enables quicker draining than by simply draining using the reverse travel engagement oil path based on an output state of the signal pressure of the first signal electromagnetic valve; and a second switching valve that is interposed on a forward travel engagement oil path that supplies an engagement pressure to a hydraulic servo of the forward travel engaging element, and that switches between an engagement position that communicates the forward travel engagement oil path and a discharge position that enables quicker draining than by simply draining using the forward travel engagement oil path based on the output state of the signal pressure of the first signal electromagnetic valve. The hydraulic control apparatus is structured so as to change the output state of the signal pressure of the first signal electromagnetic valve when changing from the reverse travel shift position and/or shift range to the non-travel shift position and/or shift range and when changing from the forward travel shift position and/or shift range to the non-travel shift position and/or shift range, and to enable quick draining of hydraulic pressure of the hydraulic servo of the reverse travel engaging element and hydraulic pressure of the hydraulic servo of the forward travel engaging element.

BRIEF DESCRIPTION OF THE DRAWINGS

Various exemplary aspects of the invention will be described with reference to the drawings, wherein:

FIG. 2 is an engagement table of an automatic transmission;

DETAILED DESCRIPTION OF EMBODIMENTS

Below, the embodiment according to the present invention will be explained with reference to FIG. 1 to FIG. 9.

Figure 1:
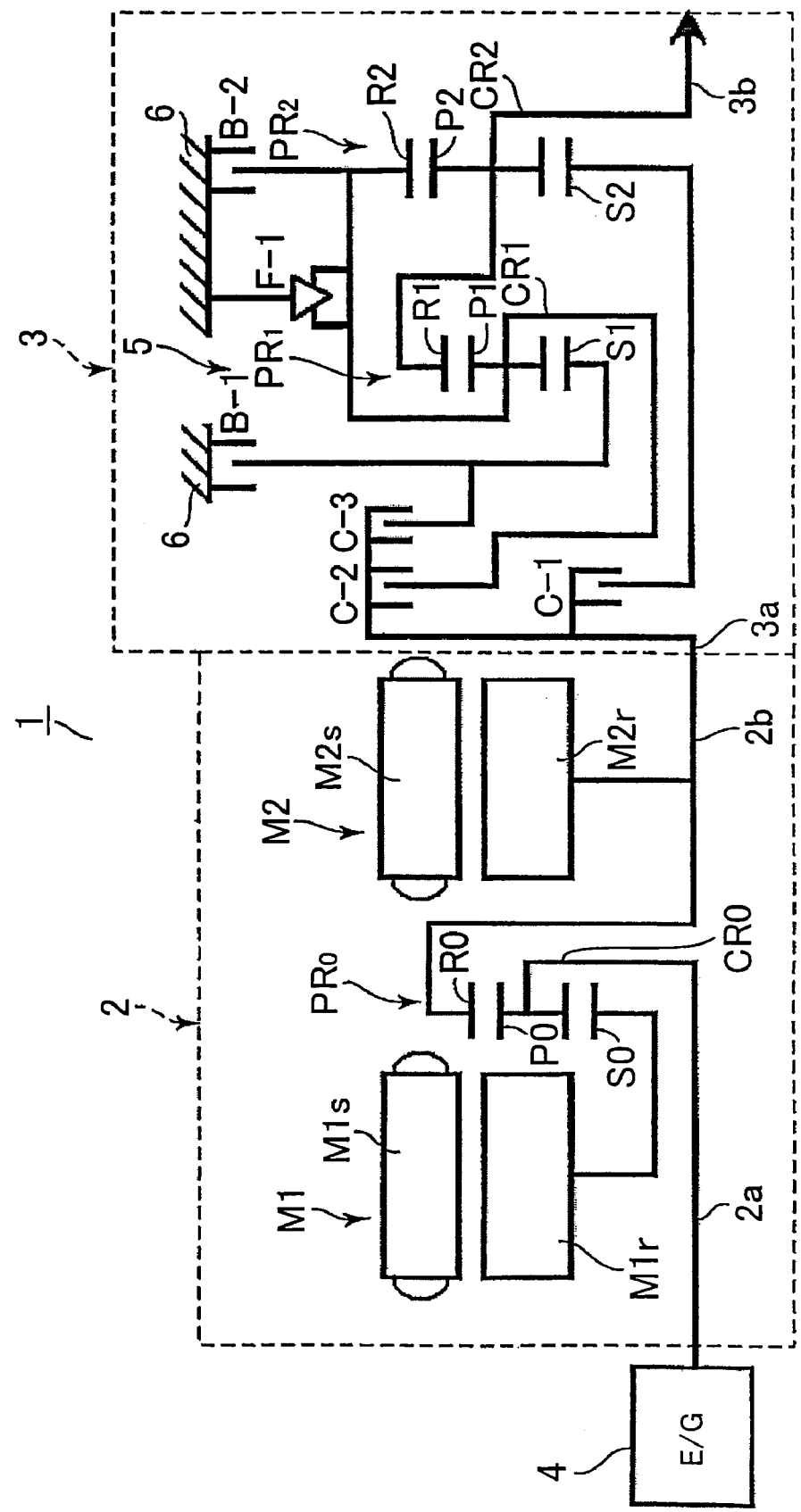
FIG. 1 is a skeleton diagram that shows a hybrid drive apparatus according to the present invention.

As shown in FIG. 1, a hybrid drive system 1 to which the present invention can be applied is broadly structured so as to be provided with a hybrid drive unit 2 that can connect to an internal combustion engine 4, and an automatic transmission 3 that can shift the rotation that is output from the hybrid drive unit 2 to, for example, four forward speeds and one reverse speed.

The hybrid drive unit 2 is what is termed a two-motor series-parallel type, and is structured so as to include an input shaft 2a (for the hybrid drive unit 2) that can be connected to the internal combustion engine 4, a power distributing planetary gear (which is an example of a power distribution mechanism) PR0, a first motor M1 that is provided with a stator M1s and a rotor M1r, a second motor M2 that is provided with a stator M2s and a rotor M2r, and a drive shaft 2b that is connected to the input shaft 3a of the automatic transmission 3, which is to be described below. Note that, in the present embodiment, for the convenience of the explanation, an explanation is provided in which the drive shaft 2b and the input shaft 3a are separate, but the drive shaft 2b and the input shaft 3a are one integrated shaft-shaped member.

The power distribution planetary gear PR0 is structured so as to be provided with a carrier CR0 that supports a pinion P0 so as to be able to rotate freely, a sun gear S0 that meshes with the pinion P0, and a ring gear R0 that similarly meshes with the pinion P0. The input shaft 2a is connected to the carrier CR0, the rotor M1r of the first motor M1 is connected to the sun gear S0, and the drive shaft 2b is connected to the ring gear R0. In addition, the rotor M2r of the second motor M2 is connected to the drive shaft 2b.

In the hybrid drive unit 2 that is structured in this manner, when the drive rotation is input from the internal combustion engine 4 to the input shaft 2a, the drive rotation of the internal combustion engine 4 is transferred to the carrier CR0. Some of the drive power of the drive rotation that has been transferred to the carrier CR0 is distributed from the sun gear S0 to the first motor M1 that suitably carries out regenerative braking control, that depends on the throttle opening degree, where the regenerative braking power becomes a reactive force. The remaining drive power of the drive rotation that has been transferred to the carrier CR0 is distributed to the ring gear R0 and output to the drive shaft 2b.

In addition, the drive power (energy) that is regenerated by the first motor M1 charges a battery (not illustrated), and is used for the drive power of the second motor M2 as appropriate. Specifically, the second motor M2 contributes drive power to the drive shaft 2b as appropriate depending on the throttle opening degree and the like (suitably regenerated during engine braking). The drive power that has been distributed in the planetary gear PR0 from the internal combustion engine 4 and the drive power of the second motor M2 are merged and the result is output from the drive shaft 2b.

Note that the speed of the drive shaft 2b at this time is a speed that is based on the gear ratio in the power distribution planetary gear PR0, which depends on the speed of the internal combustion engine 4 and the speed the first motor M1, and the rotation of this drive shaft 2b serves as the input rotation that is input to the input shaft 3a of the automatic transmission 3.

In addition, while the internal combustion engine 4 is stopped, the drive shaft 2b is suitably driven (regenerated during engine braking as appropriate) by the second motor M2 depending on the throttle opening degree and the like. That is, only the drive power of the second motor M2 is input to the input shaft 3a of the automatic transmission 3. At this time, the motor M1 is in an idle state, and the transfer of rotation is not carried out on the internal combustion engine 4.

Next, the automatic transmission 3 will be explained. The automatic transmission 3 is provided with an automatic shifting mechanism 5 inside a case (transmission case) 6, and this automatic shifting mechanism 5 is structured so as to include the input shaft 3a that is connected to the drive shaft 2b of the hybrid drive unit 2 and the output shaft 3b that is connected to the drive wheels (not illustrated). At the same time, coaxial to the input shaft 3a and the output shaft 3b, the automatic transmission 3 includes first through third clutches C-1, C-2, and C-3, first and second brakes B-1 and B-2, a one-way clutch F-1, a first planetary gear (speed change gear mechanism) PR1, and a second planetary gear (speed change gear mechanism) PR2, and the like.

The first planetary gear PR1 includes a single pinion planetary gear that is provided with a carrier CR1 that supports a pinion P1 so as to rotate freely, and a sun gear S1 and a ring gear R1 that each mesh with the pinion P1. In addition, similarly, the second planetary gear PR2 also includes a single pinion planetary gear that is provided with a carrier CR2 that supports a pinion P2 so as to rotate freely, and a sun gear S2 and a ring gear R2 that each mesh with the pinion P2.

The sun gear S2 of the second planetary gear PR2 is connected to the first clutch C-1, and the rotation of the input shaft 3a is input by the engagement of this first clutch C-1. In contrast, the sun gear S1 of the first planetary gear PR1 is connected to the third clutch (which is an example of a second engaging element) C-3 and connected to the first brake B-1, and the rotation of the input shaft 3a is input by the engagement of the third clutch C-1. In addition, the rotation with respect to the case 6 is locked by the engagement of the first brake B-1.

The carrier CR1 of the first planetary gear PR1 is rotationally linked to the ring gear R2 of the second planetary gear PR2, and at the same time, connected to the second clutch C-2, and the rotation of the input shaft 3a is input by the engagement of the second clutch C-2. In addition, the carrier CR1 and the ring gear R2 are restricted to one-directional rotation with respect to the case 6 by the one-way clutch F-1, and at the same time, are connected to the second brake (which is an example of a first engaging element) B-2, and the rotation with respect to the case 6 is locked by the engagement of the second brake B-2. In addition, the ring gear R1 of the first planetary gear PR1 is rotationally linked to the carrier CR2 of the second planetary gear PR2, and at the same time, connected to the output shaft 3b.

Figure 3:
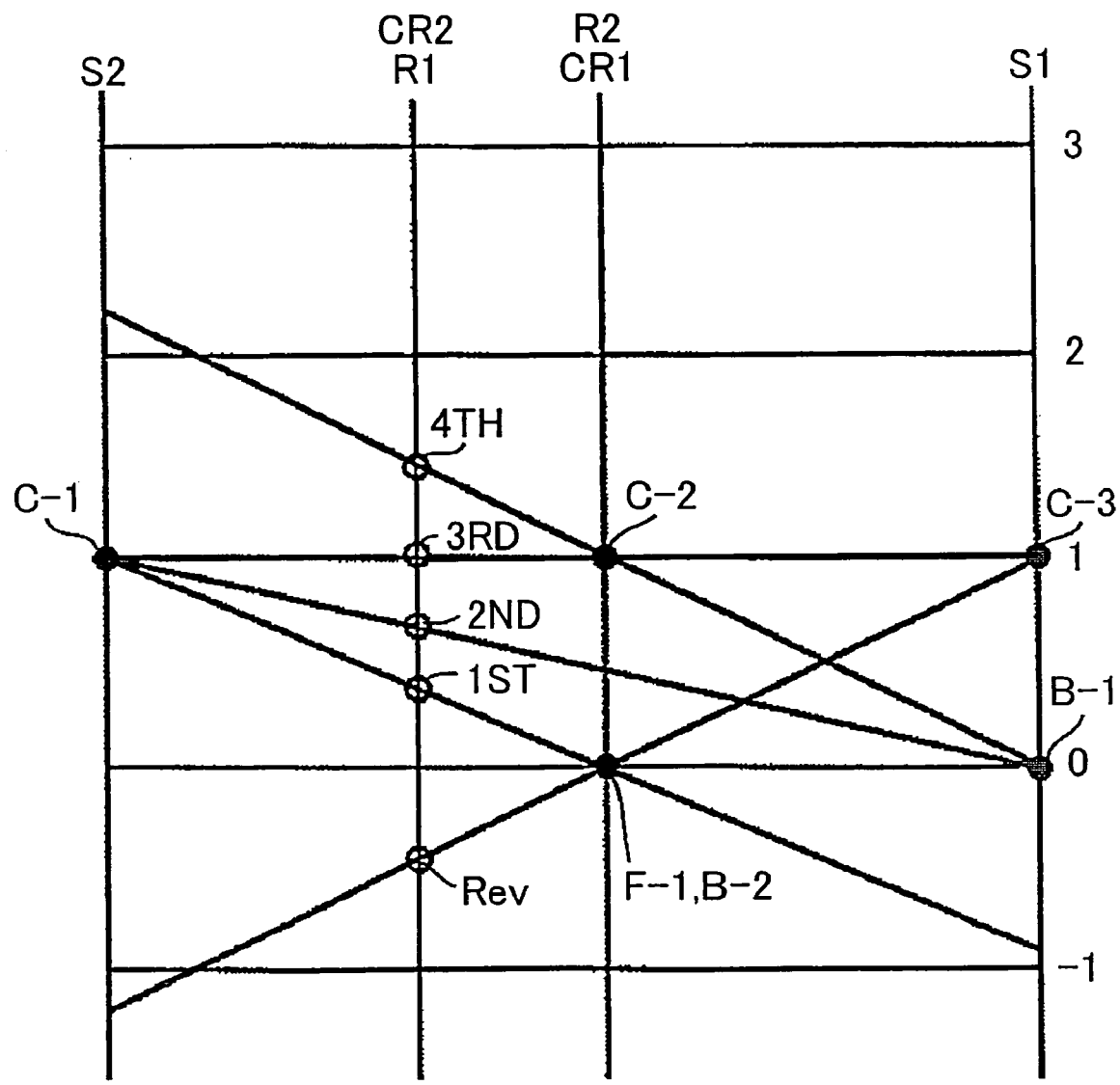
FIG. 3 is a velocity diagram of the automatic transmission.

Next, the operation of the automatic transmission 3 will be explained with reference to FIG. 2 and FIG. 3, while referring to FIG. 1.

In the D (drive) range, for example, as shown in FIG. 2, in the first forward speed (1st), the first clutch C-1 and the one-way clutch F-1 are engaged. Thereby, as shown in FIG. 1 and FIG. 3, the input rotation of the input shaft 3a (the drive rotation of the drive shaft 2b of the hybrid drive unit 2) is input to the sun gear S2 via the first clutch C-1. In addition, the rotation of the ring gear R2 is restricted to one direction, that is, the reverse rotation of the ring gear R2 is prevented and the rotation thereof is held stationary. Thereby, the rotation of the carrier CR2 is reduced to serve as the first forward speed due to the input rotation that is input to the sun gear S2 and the ring gear R2 that is held stationary, and the reduced rotation of the first forward speed is output from the output shaft 3b.

In addition, during engine braking (i.e., during coasting), the state of the first forward speed is maintained by locking the brake B-2, holding the ring gear R2 stationary, and preventing the positive rotation of the ring gear R2. Note that in the first forward speed, because the reverse rotation of the second carrier CR2 is prevented by the one-way clutch F-1 and the positive rotation is enabled, the establishment of the first forward speed when switching, for example, from a non-travel range to a travel range can be carried out more smoothly by the automatic engagement of the one-way clutch F-1.

In the second forward speed (2nd), as shown in FIG. 2, the first clutch C-1 and the first brake B-1 are engaged. Thereby, as shown in FIG. 1 and FIG. 3, the input rotation of the input shaft 3a is input to the sun gear S2 via the first clutch C-1. In addition, the rotation of the sun gear S1 is held stationary by the first brake B-1. Thereby, the rotation of the carrier CR2 and the ring gear R1 is reduced by the input rotation that has been input by the sun gear S2, and at the same time, the rotation of the carrier CR1 and the ring gear R2 is reduced more than that of the reduced rotation of the carrier CR2 and the ring gear R1 based on the reduced rotation of the ring gear R1 and the stationary sun gear S1. In addition, the rotation of the carrier CR2 is reduced to serve as the second forward speed due to the reduced rotation of the ring gear R2 and the input rotation of the sun gear S2, and the reduced rotation of the second forward speed is output to the output shaft 3b.

In the third forward speed (3rd), as shown in FIG. 2, the first clutch C-1 and the second clutch C-2 are engaged. Thereby, as shown in FIG. 1 and FIG. 3, the input rotation of the input shaft 3a is input to the sun gear S2 via the first clutch C-1, and at the same time, the input rotation is input to the carrier gear CR1 and the ring gear R2 via the second clutch C-2. Thereby, the second planetary gear PR2 is directly linked due to the input rotation that is input to the sun gear S2 and the ring gear R2, the carrier CR2 has a directly linked rotation that serves as the third forward speed, and the positive rotation of the third forward speed is output from the output shaft 3b.

In the fourth forward speed (4th), as shown in FIG. 2, the second clutch C-2 and the first brake B-1 are engaged. Thereby, as shown in FIG. 1 and FIG. 3, the input rotation of the input shaft 3a is input to the carrier CR1 via the second clutch C-2. In addition, the rotation of the sun gear S1 is held stationary by the first brake B-1. Thereby, the rotation of the ring gear R1 is increased to serve as the fourth forward speed by the input rotation that is input by the carrier CR1 and the stationary sun gear S1, and the increased rotation of the fourth forward speed is output from the output shaft 3b via the carrier CR2.

In reverse speed (Rev), as shown in FIG. 2, the third clutch C-3 and the second brake B-2 are engaged. Thereby, as shown in FIG. 1 and FIG. 3, the input rotation of the input shaft 3a is input to the sun gear S1 via the third clutch C-3. In addition, the rotation of the carrier CR1 is held stationary by the second brake B-2. Thereby, the rotation of the ring gear R1 is reversed due to the input rotation that is input by the sun gear S1 and the carrier CR1 that is held stationary, and the reverse rotation, which serves as the reverse speed, is output from the output shaft 3b via the carrier CR2.

Note that, in the P (parking) range and the N (neutral) range, the first clutch C-1, the second clutch C-2, and the third clutch C-3 are disengaged. Thereby, the input shaft 3a is cut off from the first planetary gear PR1 and the second planetary gear PR2, that is, the power transfer between the input shaft 3a and the output shaft 3b is cut off.

In the automatic transmission 3 of the hybrid drive system 1 having the structure that has been described above, the shift control is carried out by controlling the engagement and disengagement of the first through third clutches C-1, C-2, and C-3, and the first and second brakes B-1 and B-2 by using the hydraulic control apparatus. Below, a hydraulic control apparatus 10 of the automatic transmission 3 will be explained with reference to FIG. 4.

Figure 4:
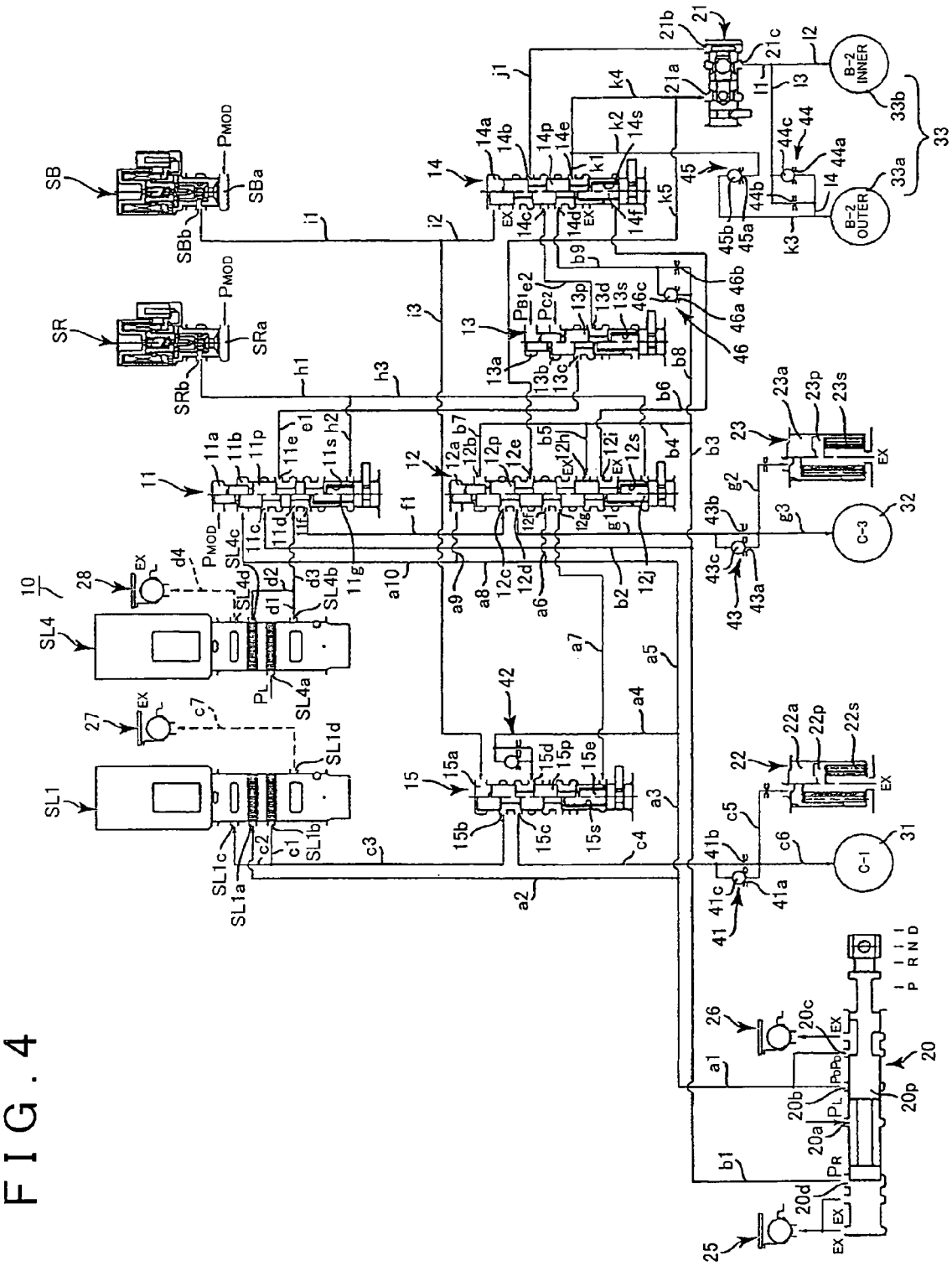
FIG. 4 is a schematic drawing that shows a hydraulic control apparatus for the automatic transmission according to the present invention.

Note that FIG. 4 shows some of the components of the hydraulic control apparatus 10. As should be appreciated, the actual hydraulic control apparatus 10 is provided with many other valves, oil paths, and the like. The hydraulic control apparatus 10 according to the present invention is provided in particular with two linear solenoid valves (SL2 to SL3, not illustrated) that respectively directly supply control pressures to the hydraulic servo of the second clutch C-2 and the hydraulic servo of the first brake B-1, and the control of the engagement and disengagement of the second clutch C-2 and the first brake B-1 is carried out by the respective linear solenoid valves. However, in the following explanation, the explanation of the portions related to the first clutch C-1, the third clutch C-3, the second brake B-2, and the linear solenoid valves (which are examples of a first pressure regulating electromagnetic valve and a second pressure regulating electromagnetic valve) SL1 and SL4, according to the present invention, will be emphasized. As should be appreciated, the first clutch C-1 is an example of a forward travel engaging element and the second brake B-2 is an example of a reverse travel engaging element.

In addition, the hydraulic control apparatus 10 is provided with an electrical oil pump that is actuated, for example, when the ignition is turned ON, and a mechanical oil pump (not illustrated) that is actuated by being linked to the internal combustion engine 4. The hydraulic pressure that is generated by these oil pumps is regulated by the line pressure PL depending on the throttle opening degree by a primary regulator valve (not illustrated). Note that an electrical oil pump may be singly provided as the oil pump.

As shown in FIG. 4, the manual valve (which is an example of a range pressure switching valve) 20 includes a spool 20p.

The spool 20p is positioned at the driver's seat (not illustrated), and is moved in the left and right directions in the figure by being mechanically or electronically linked to a shift bar for carrying out the operation of selecting the shift range. The manual valve 20 includes an input port 20a to which the line pressure PL is input, and in particular, while in the P range and the N range due to a shift lever operation, the input port 20a and the output ports 20b, 20c, and 20d, which will be described below, are blocked due to the spool 20p.

The manual valve 20 includes output ports (which is an example of a forward travel range pressure output ports) 20b and 20c that communicate with the input port 20a when the spool 20p is in the D range position due to a shift lever operation, and while in the D range, a line pressure PL is output from the output ports 20b and 20c to the oil paths a1 to a10 as the forward travel range pressure PD. In addition, when changing to ranges other than the D range due to a shift lever operation, that is, when the spool 20p is positioned in the P range, the R range, or the N range, the output ports 20b and 20c communicate with the drain port EX, and the forward travel range pressure PD in the oil paths a1 to a10 is drained (discharged) via the check ball valve 26.

Furthermore, the manual valve 20 includes an output port (which is an example of a reverse travel range pressure output port) 20d that communicates with the input port 20a when the spool 20p is in the R range position due to a shift lever operation, and outputs a line pressure PL from the output port 20d to the oil paths b1 to b9 as the reverse travel range pressure PR when in the R range. In addition, similarly, when changed to a range other than the R range due to a shift lever operation, that is, when the spool 20p is positioned in the P range, the N range, or the D range, the output port 20d communicates with the drain ports EX, and the reverse travel range pressure PR in the oil paths b1 to b9 is drained (discharged) via the check ball valve 25.

Here, the structure of the check ball valve will be explained with reference to FIG. 5B. As shown in FIG. 5B, the check ball valve 25 is disposed on the upper side of a vehicle in the normal state with respect to a valve body 50 in which the oil paths are formed that structure the hydraulic control apparatus 10. The valve body 50 and the check ball valve 25 are on the lower side of the case 6 that accommodates the automatic shifting mechanism 5, and are disposed so as to be accommodated in the oil pan that receives and recovers lubricating oil when the lubricating oil that lubricates the inside of the automatic shifting mechanism 5 flows downstream via a hole that is formed in the bottom of the case 6.

The valve body 50 includes a body main portion 50a that is formed in a three-dimensional groove shape, and the upper side is formed by being closed by the upper plate 50g. A valve hole 50c, in which the spool 20p of the manual valve 20 is disposed, is bored, and the drain port EX of the manual valve 20 communicates with the oil path 50b that is formed in the body main portion 50a.

In addition, the check ball valve 25 is structured by a ball valve body 25a, an oil hole 25b that is bored into the ball valve body 25a, a ball 25c that is formed so as to have a larger diameter than the oil hole 25b and that closes the oil hole 25b due to its own weight, and a cover 25d that covers the ball 25c. The ball valve body 25a is attached to the upper plate 50g, and at the same time, an oil hole is bored into this upper plate 50g, and the oil path 50b and the oil hole 25b communicate.

However, as described above, the check ball valve 25 and the valve body 50 are on the bottom side of the case 6 and disposed at a position at which the lubricating oil that lubricates the inside of the automatic shifting mechanism 5 is flowing downward. There is a concern that metal powder and the like that are produced in the automatic shifting mechanism 5 will mix into the lubricating oil and that this metal powder will enter the check ball valve 25. Note that when the check ball valve is disposed toward the bottom side, the check ball valve cannot be closed by the ball, and there is, of course, a concern about the occurrence of the mixing of air when the oil flows downward.

Figure 5A:
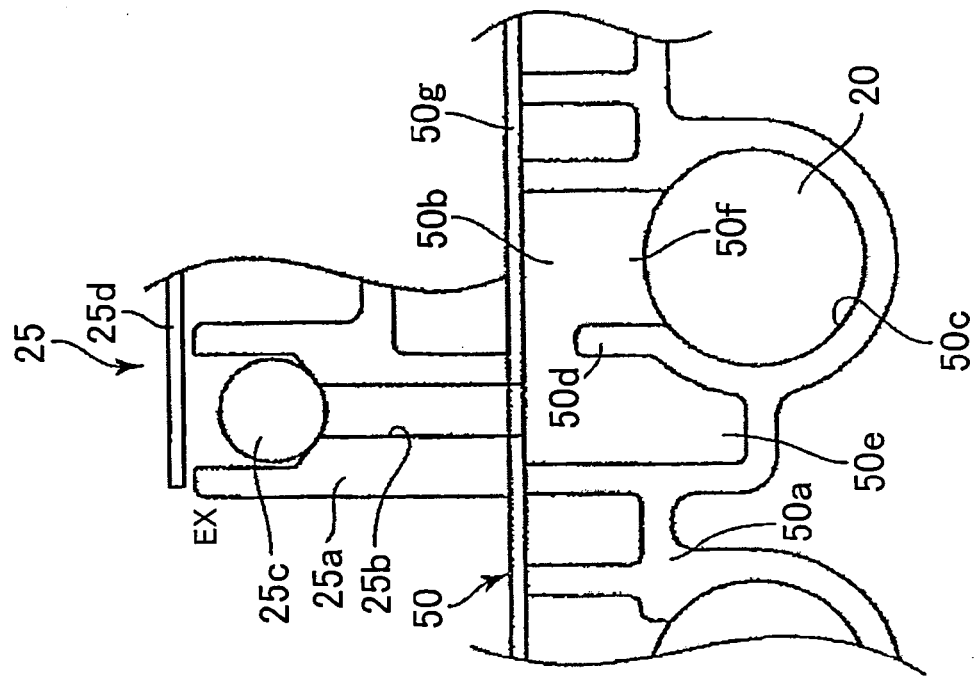
FIGS. 5A and 5B are schematic cross-sectional drawings that show a check ball valve.
Figure 5B:
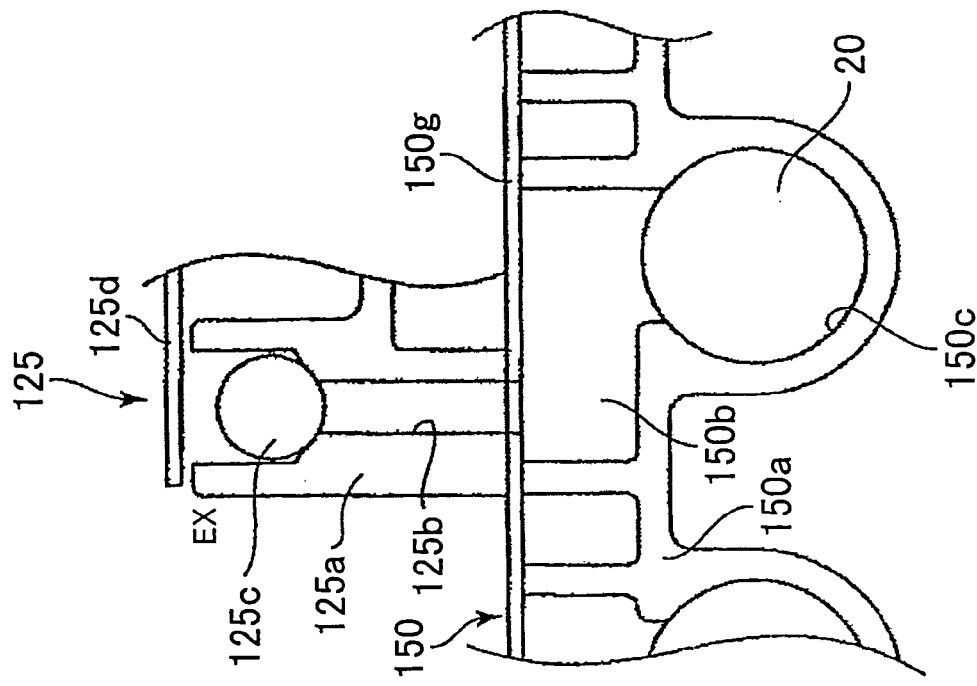

Thus, when structured similar to the check ball valve 125 and the valve body 150 that are shown in FIG. 5A, although the ball valve body 125a is covered by the cover 125d, there are cases in which metal powder enters the part around the ball 125c, and when the ball 125c is raised upward due to the hydraulic pressure that is discharged from the drain port EX of the manual valve 20, then the metal powder enters up to the oil path 150b of the body main portion 150a via the oil hole 125b and the oil hole of the upper plate 150g. In addition, because the valve hole 150c of the manual valve 20 is formed more toward the bottom side than this oil path 150b, there is a concern that metal powder penetrates between the spool 20p and the valve hole 150c, and valve sticking will occur.

Thus, in the valve body 50 in the present embodiment, as shown in FIG. 5B, a partition portion 50d is provided inside the oil path 50b of the body main portion 50, and structured by separating this oil path 50b into the first chamber 50e and the second chamber 50f. Specifically, on the bottom side of the oil hole 25b of the check ball valve 25, the first chamber 50e is formed that is shaped so as to serve as an oil reservoir by the partition portion 50d, and a structure is used such that, in the worst case, even if metal powder should enter via the check ball valve 25, the metal powder will settle in the first chamber 50e, and will not readily enter into the second chamber 50f. Thereby, preventing the occurrence of valve sticking can be realized as described above.

Note that in the above, an explanation was provided that used a check ball valve 25 as one example, but all of the other check ball valves 26, 27, 28 and the like in the hydraulic control apparatus 10 are all formed identically, and in particular, the prevention of valve sticking can be similarly realized even if the valves that are disposed in proximity to the check ball valves are valves, such as linear solenoid valves, in which a magnetic force is produced.

In addition, as shown in FIG. 4, in the hydraulic control apparatus 10, the oil path a1, which is connected to the output ports 20b and 20c of the manual valve 20, is connected to the input port SL1a of the linear solenoid valve SL1 via the oil path a2, that is, the forward travel range pressure PD is input to the linear solenoid valve SL1 as the original pressure. The linear solenoid valve SL1 is structured by including a spool (not illustrated), an input port SL1a, an output port SL1b that is connected to the oil path c1, a feedback oil chamber SL1c that inputs the feedback pressure from the oil path c1 via the oil path c2, and a drain port SL1d that is connected to the oil path c7, which communicates with the check ball valve 27.

The linear solenoid valve SL1 is, for example, a normally-opened valve, and when energized, the input port SL1a and the output port SL1b are blocked by the spool, the output port SL1b and the drain port SL1d are communicated, and the spool moves as the strength of the conducted current is reduced. The output port SL1b and the drain port SL1d are gradually blocked, and at the same time, the input port SL1a and the output port SL1b are gradually communicated. Thereby, the forward travel range pressure PD of the input port SL1a is regulated and output from the output port SL1b as the control pressure PSL1 while undergoing feedback control by the feedback pressure that is input to the feedback oil chamber SL1c.

In the linear solenoid valve SL4, the line pressure PL is input to the input port SL4a as the original pressure. The linear solenoid valve SL4 is structured by including a spool (not illustrated), an input port SL4a, an output port SL4b that is connected to the oil path d1, a feedback oil chamber SL4c that inputs the feedback pressure from the oil path d1 via the oil path d2, and a drain port SL4d that is connected to the oil path d4 that communicates with the check ball valve 28.

This linear solenoid valve SL4 is a normally closed valve. When not energized, the input port SL4a and the output port SL4b are blocked by the spool, and the output port SL4b and the drain port SL4d are communicated. The spool is moved depending on the strength of the conducted current, and the output port SL4b and the drain port SL4d are gradually blocked, and at the same time, the input port SL4a and the output port SL4b are gradually communicated. Thereby, the line pressure PL of the input port SL4a is regulated and output from the output port SL4b as the control pressure PSL4 while feedback control is carried out by using the feedback pressure that is input to the feedback oil chamber SL4c.

In addition, a solenoid valve (which is an example of the second signal electromagnetic valve) SR is structured by including an input port SRa that inputs the modulating pressure PMOD from a modulator valve (not illustrated) and an output port SRb that is connected to the oil paths h1, h2, and h3. Note that the modulator valve is a valve that inputs the line pressure PL, and outputs line pressure PL as a constant modulating pressure PMOD based on the urging force of a spring that urges the spool and the feedback pressure when the line pressure PL, which increases based on the throttle opening degree, becomes equal to or greater than a predetermined pressure.

The solenoid valve SR is, for example, a three-way normally closed valve. When not energized, the input port SRa and the output port SRb are blocked, and when energized, the input port SRa and the output port SRb are communicated, and the signal pressure PSR from the output port SRb is output to the oil paths h1, h2, and h3.

In addition, similarly, the solenoid valve SB (which is an example of the first signal electromagnetic valve) is structured by including an input port SBa that inputs a modulating pressure PMOD from a modulator valve (not illustrated) and an output port SBb that is connected to the oil paths i1, i2, and i3, and is structured by, for example, a three-way normally-closed valve. When not energized, the input port SBa and the output port SBb are blocked, and when energized, the input port SBa and the output port SBb are communicated, and the signal pressure PSB from the output port SBb is output to the oil paths i1, i2, and i3.

A C2B2 relay valve 11 is structured by including a spool 11p, a spring 11s that urges the spool 11p in one direction (toward the upper side in FIG. 4), a hydraulic oil chamber 11a to which the modulating pressure PMOD is input, a hydraulic oil chamber 11b to which the forward travel range pressure PD from the output ports 20b and 20c of the manual valve 20 is input via the oil paths a1, a3, a5, a8, and a10, an input port 11c to which the reverse travel range pressure PR from the output port 20d of the manual valve 20 is input via the oil paths b1 and b2, an input port 11d to which the control pressure PSL4 from the output port SL4b of the linear solenoid valve SL4 is input via the oil paths d1 and d2, an output port 11e that is connected to the oil path e1, an output port 11f that is connected to the oil path f1, and a hydraulic oil chamber 11g to which the signal pressure PSR of the solenoid valve SR is input via the oil path h2.

In the C3B2 relay valve 11, when, for example, the line pressure PL is generated due to turning the ignition ON, the modulating pressure PMOD is input to the hydraulic oil chamber 11a, the urging force of the spring 11s is overcome, and the spool 11p moves to the position that is shown on the right half in FIG. 4 (below, referred to as the "right-half position"). When in the right-half position, the input port 11d and the output port 11e are communicated, that is, the control pressure PSL4 of the linear solenoid valve SL4 that is supplied to the oil path d3 can be supplied to the oil path e1.

In addition, in the C3B2 relay valve 11, when the control pressure PSR is input to the hydraulic oil chamber 11g from the right-half position, the urging force of the spring 11s and the signal pressure PSR of the hydraulic oil chamber 11g is overcome by the modulating pressure PMOD of the hydraulic oil chamber 11a, and the spool 11p moves from the right-half position to the position that is shown at the left-half in FIG. 4 (below, referred to as the "left-half position"). When in the left-half position, the input port 11c and the output port 11e are communicated, and the input port 11d and the output port 11f are communicated, that is, the reverse travel range pressure PR from the manual valve 15 can be supplied to the oil path e1, and at the same time, the control pressure PSL4 of the linear solenoid valve SL4, which is supplied to the oil path d3, can be supplied to the oil path f1.

In addition, when the forward travel range pressure PD is input to the hydraulic oil chamber 11b, the C3B2 relay valve 11 changes from the left-half position to the right half-position, which has been described above, due to the modulating pressure PMOD of the hydraulic oil chamber 11a and the forward travel range pressure PD of the hybrid oil chamber 11b by overcoming the urging force (and the signal pressure PSR of the hydraulic oil chamber 11g (when the signal pressure PSR has been input)) of the spring 11s, irrespective of the input state of the signal pressure PSR of the hydraulic oil chamber 11g.

A C3 relay valve (which is an example of the third switching valve; secure valve) 12 is structured so as to include a spool 12p, a spring 12s that urges the spool 12p in one direction (toward the upper side in FIG. 4), a hydraulic oil chamber 12a to which the forward travel range pressure PD from the output ports 20b and 20c of the manual valve 20 is input via the oil paths a1, a3, a5, a8, and a9, a hydraulic oil chamber 12b to which the reverse travel range pressure PR from the output port 20d of the manual valve 20 is input via the oil paths b1, b3, b4, and b7, an input port 12c to which the control pressure PSL4 from the linear solenoid valve SL4 is input via the oil path f1, an output port 12d that is connected to the oil path g1, an input port 12e to which the reverse travel range pressure PR of the oil paths k4 and k5 is input via the oil paths e1 and e2 and the B2 relay valve 14, which will be explained in detail below, an input port 12f to which the forward travel range pressure PD from the output ports 20b and 20c of the manual valve 20 is input via the oil paths a1, a3, a5, and a6, an output port 12g that is connected to the oil path a7, an input port 12h to which the reverse travel range pressure PR from the output port 20d of the manual valve 20 is input via the oil paths b1, b3, b4, and b5, an output port 12i that is connected to the oil path b6, and a hydraulic oil chamber 12j to which the signal pressure PSR of the solenoid valve SR is input via the oil path h3.

In the C3 relay valve 12, when the forward travel range pressure PD is input to the hydraulic oil chamber 12a or the reverse travel range pressure PR is input to the hydraulic oil chamber 12b, the urging force of the spring 12s is overcome, and the spool 12p moves to the right-half position. When in the right-half position, the input port 12c and the output port 12d are blocked, and the input port 12e and the output port 12d are communicated, that is, the reverse travel range pressure PR that is supplied to the oil path k5 via the B2 relay valve 14 can be supplied to the oil path g1, which will be described below. In addition, when in the right-half position, the input port 12f and the output port 12g are blocked and the output port 12g and the drain port EX are communicated. In addition, the input port 12h and the output port 12i are blocked and the output port 12i and the drain port EX are communicated, that is, the forward travel range pressure PD of the oil path a7 is drained and the reverse travel range pressure PR of the oil path b6 is drained.

In addition, the C3 relay valve 12 is set in the left-half position by overcoming the urging force of the spring 12 and the signal pressure PSR of the hydraulic oil chamber 12j when the signal pressure PSR is input to the hydraulic oil chamber 12j, irrespective of the input state of the forward travel range pressure PD of the hydraulic oil chamber 12a or the input state of the reverse travel range pressure PR of the hydraulic oil chamber 12b. When set in the left-half position, the input port 12e and the output port 12d are blocked, and at the same time, the input port 12c and the output port 12d are communicated, that is, the control pressure PSL4 of the linear solenoid valve SL4 can be supplied to the oil path m1 via the oil path g1 via the oil path f1. Furthermore, when set in the left-half position, the input port 12f and the output port 12g are communicated and the input port 12h and the output port 12i are communicated, that is, the forward travel range pressure PD is output to the oil path a7 and the reverse travel range pressure PR is output to the oil path b6.

The oil path g1 that is connected to the output port 12d of the C3 relay valve 12 communicates the oil paths g2 and g3, connects to a damper 23 via the oil path g3, and at the same time, it is connected to a hydraulic servo 32 of the third clutch C-3. In addition, the check ball valve 43 is interposed between the oil path g1 and the oil path g2. The check ball valve 43 is structured so as to include an orifice 43a and an orifice 43b that are respectively interposed at the two divided oil paths, and a ball 43c that freely contacts and separates from the orifice 43a. The draining speed from the oil path g3 to the oil path g1 increases in comparison to the supply speed from the oil path g1 to the oil path g3 with respect to the hydraulic servo 32 of the third clutch C-3.

In addition, the damper 23 is structured so as to include an oil chamber 23a, a spring 23s, and a piston 23p that is urged in the direction toward the oil chamber 23a by the spring 23s, and decreases the pulsation of the hydraulic pressure of the oil paths g2 and g3, that is, reduces the pulsation of the engagement pressure PC3 (specifically, the control pressure PSL4 and the reverse travel range pressure PR) that is supplied to the hydraulic servo 32 of the third clutch C-3.

In addition, a B2 cut-off valve 13 is structured so as to include a spool 13p, a spring 13s that urges the spool 13p in one direction (toward the upper side in FIG. 4), a hydraulic oil chamber 13a to which the engagement pressure PB1 from the hydraulic servo (not illustrated) of the first brake B-1 is input, a hydraulic oil chamber 13b to which the engagement pressure PD2 from the hydraulic servo (not illustrated) of the second clutch C-2 is similarly input, an input port 13c that is connected to the oil path e1, and an output port 13d that is connected to the oil path e2.

The B2 cut-off valve 13 is set in the right-half position by overcoming the urging force of the spring 13s when the engagement pressure PB1 is input to the hydraulic oil chamber 13a or the engagement pressure PC2 is input to the hydraulic oil chamber 13b. When in the right-half position, the input port 13c and the output port 13d are blocked, that is, the control pressure PSL4 of the linear solenoid valve SL4, which is supplied from the oil path e1, and the reverse travel range pressure PR are blocked.

In addition, the B2 cut-off valve 13 is set to the left-half position due to the urging force of the spring 13s when neither the engagement pressure PB1 nor the engagement pressure PC2 is input to the hydraulic oil chamber 13a or the hydraulic oil chamber 13b. When in the left-half position, the input port 13c and the output port 13d are communicated, that is, the control pressure PSL4 of the linear solenoid valve SL4, which is supplied via the oil path e1, and the reverse travel range pressure PR are supplied to the oil path e2.

The B2 relay valve (which is an example of the first switching valve) 14 is structured so as to include a spool 14p, a spring 14s that urges the spool 14p in one direction (toward the upper side in FIG. 4), a hydraulic oil chamber 14a to which the signal pressure PSB from the output port SBb of the solenoid valve SB is input, an output port 14b that is connected to the oil path j1, an input port 14c that is connected to the oil path e2, an input port 14d to which the reverse travel range pressure PR is input via the oil paths b1, b3, b8, and b9, an output port 14e that is connected to the oil path k1, and a hydraulic oil chamber 14f that is connected to the oil path b6.

Note that a check ball valve 46 is interposed between the oil path b8 and the oil path b9. The check ball valve 46 is structured so as to have an orifice 46a and an orifice 46b that are respectively interposed at the two divided oil paths, and a ball 46c that freely contacts and separates from the orifice 46a. The draining speed from the oil path b9 to the oil path b8 is delayed in comparison to the supply speed of the reverse travel range pressure PR from the oil path b8 to the oil path b9.

The B2 relay valve 14 is set in the left-half position due to the urging force of the spring 14s when the signal pressure PSB is not input to the hydraulic oil chamber 14a. When in the left-half position, the input port 14c is blocked and the output port 14b and the drain port EX are communicated, and at the same time, the input port 14d and the output port 14e are communicated, and the reverse travel range pressure PR from the oil path b9 is supplied to the oil path k1.

In addition, the B2 relay valve 14 is set in the right-half position by overcoming the urging force of the spring 14s when the signal pressure PSB is input to the hydraulic oil chamber 14a. When in the right-half position, the input port 14c and the output port 14b are communicated, and the output port 14e and the drain port EX are communicated, that is, the control pressure PSL4 of the linear solenoid valve SL4 that is supplied from the oil path e2 and the reverse travel range pressure PR can be supplied to the oil path j1, and the hydraulic pressure of the oil path k1 is drained.

Furthermore, the B2 relay valve 14 switches to the left-half position described above when the reverse travel range pressure PR is input to the hydraulic oil chamber 14f irrespective of the input state of the signal pressure PSB of the hydraulic oil chamber 14a.

The oil path j1 is connected to the input port 21b of the check valve 21 and the oil path k1 is connected to the input port 21a of the check valve 21 via the oil path k4. The check valve 21 includes the input port 21a, the input port 21b, and the output port 21c that is connected to the oil path l1, and the higher of the hydraulic pressure in the oil path j1 and the hydraulic pressure in the oil path k4 is communicated with the oil path l1, and the lower pressure oil path and the oil path l1 are blocked. Note that the oil path k5 is connected to the oil path k4 and the oil path k5 is connected to the input port 12e of the C3 relay valve 12.

In addition, the check ball valve 45 is interposed between the oil path k2 and the oil path k3. The check ball valve 45 is structured so as to have an orifice 45a and a ball 45b that freely contacts and separates from the orifice 45a, and is structured such that the supply of hydraulic pressure from the oil path k2 to the oil path k3 is permitted and the draining from the oil path k3 to the oil path k2 is blocked, that is, the reverse flow of the hydraulic pressure from the oil path k3 to the oil path k2 is blocked, that is, the reverse flow of the hydraulic pressure from the oil path k3 to the oil path k2 is prevented.

A hydraulic servo 33 of the second brake B-2 is what is referred to as a double piston type hydraulic servo, and includes the B-2 outer oil chamber 33a and a B-2 inner oil chamber 33b. The B-2 outer oil chamber 33a is connected to the oil path k3, and the B-2 inner oil chamber 33b is connected to an oil path l2 and connected to the oil path l1. In addition, the oil path k3 and the oil path l2 are connected by an oil path l3, the check ball valve 44, and an oil path l4. The check ball 44 is structured so as to have an orifice 44a and an orifice 44b that are respectively interposed on the two divided oil paths, and a ball 44c that freely contacts and separates from the orifice 44a, and is structured such that the draining speed from the oil path l4 to the oil path l3 increases in comparison to the supply speed of the hydraulic pressure from the oil path l3 to the oil path l4. Thereby, the hydraulic pressure of the oil path l2 does not normally become lower than the hydraulic pressure of the oil path k3, that is, the hydraulic pressure of the B-2 outer oil chamber 33a is prevented from becoming higher than the hydraulic pressure of the B-2 inner oil chamber 33b, and thereby a partition (not illustrated) that separates the B-2 outer oil chamber 33a and the B-2 inner oil chamber 33b is prevented from moving.

In addition, a C1 relay valve (which is an example of second switching valve) 15 includes a spool 15p, a spring 15s that urges the spool 15p in one direction (the upper side of FIG. 4), a hydraulic oil chamber 15a to which the signal pressure PSB from the solenoid valve SB is input via the oil paths i1 and i3, an input port 15b to which the control pressure PSL1 from the linear solenoid valve SL1 is input via the oil path c3, an output port 15c that is connected to the oil path c4, a connecting port 15d that is connected to the output ports 20b and 20c of the manual valve 20 via the oil paths a1, a3, and a4, and a hydraulic oil chamber 15e to which the forward travel range pressure PD from the oil paths a1, a3, a5, and a6 is input via the oil path a7.

The C1 relay valve 15 is set in the left-half position due to the urging force of the spring 15s when the signal pressure PSB is not input to the hydraulic oil chamber 12a. When in the left-half position, the input port 15b and the output port 15c are communicated, that is, the control pressure PSL4 of the linear solenoid valve SL4 can be supplied to the oil path c4 via the oil path c3.

In addition, the C1 relay valve 15 is set in the right-half position by overcoming the urging force of the spring 15s when the signal pressure PSB is input to the hydraulic oil chamber 15a via the oil path i3. When set in the right-half position, the input port 15c and the connection port 15d are communicated, that is, the oil path c4 and the output ports 20b and 20c of the manual valve 20 are communicated.

Furthermore, the C1 relay valve 15 switches to the left-half position described above when the forward travel range pressure PD is input to the hydraulic oil chamber 15e irrespective of the input state of the signal pressure PSB of the hydraulic oil chamber 15a.

The oil path c4, which is connected to the connecting port 15d of the C1 relay valve 15, communicates the oil paths c5 and c6, is connected to a damper 22 via the oil path c5, and is connected to a hydraulic servo 31 of the first clutch C-1. In addition, a check ball valve 41 is interposed between the oil path c4 and the oil path c6. The check ball valve 41 is structured so as to include an orifice 41a and an orifice 41b that are respectively interposed at the two divided oil paths, and a ball 41c that freely contacts and separates from the orifice 41a, and is structured such that the draining speed from the oil path c6 to the oil path c4 increases in comparison to the supply speed from the oil path c4 to the oil path c6 with respect to the hydraulic servo 31 of the first clutch C-1.

In addition, the damper 22 is structured so as to include an oil chamber 22a, a spring 22s, and a piston 22p that is urged in a direction toward the oil chamber 22a by the spring 22s, and the pulsation of the hydraulic pressure of the oil paths c5 and c6 is reduced, that is, the pulsation of the engagement pressure PC1 (that is, the control pressure PSL1) that is supplied to the hydraulic servo 31 of the first clutch C-1 is reduced.

Next, the operation of the hydraulic control apparatus 10 will be explained based on the structure that has been explained above.

When a driver carries out the operation of selecting the D position (forward travel shift position and/or shift range) by using the shift lever and the spool 20p of the manual valve 20 set in to the D range position, and when the first forward speed (1st) is identified by a control unit (ECU; not illustrated), the solenoid valve SR and the solenoid valve SB are turned OFF by electronic commands from the control unit.

Thereby, in the C3 relay valve 12, the forward travel range pressure PD that is output from the output ports 20b and 20c of the manual valve 20 is input to the hydraulic oil chamber 12a via the oil paths a1, a3, a5, and a9, and the C3 relay valve 12 is set in the right-half position. Thereby, the forward travel range pressure PD that is input from the output ports 20b and 20c of the manual valve 20 via the oil paths a1, a3, a5, and a6 is blocked, and the forward travel range pressure PD is not output to the oil path a7.

In order to do this, the signal pressure PSB is not input to the hydraulic oil chamber 15a and the forward travel range pressure PD is not input to the hydraulic oil chamber 15e, and the C1 relay valve 15 is set in the left-half position due to the urging force of the spring 15s. Thereby, the input port 15b and the output port 15c are communicated, and the oil paths c1, c3, c4, c5 and c6 (which is an example of forward travel engagement oil paths, control pressure supply oil paths) are communicated. In addition, the forward travel range pressure PD is supplied to the input port SL1a of the linear solenoid valve SL1, and the linear solenoid valve SL1 modulates the forward travel range pressure PD, which is output by the output port SL1b as the control pressure PSL1, and thereby, the control pressure PSL1 is supplied to the hydraulic servo 31 of the first clutch C-1 as the engagement pressure PC1 while the pulsation is reduced by the damper 22, and the first clutch C-1 is engaged. Note that in this first forward speed, the first clutch C-1 and the one-way clutch F-1 are engaged (refer to FIG. 1 to FIG. 3), and the first forward speed is established.

In addition, the C3B2 relay valve 11 is set in the right-half position because the modulating pressure PMOD is input to the hydraulic oil chamber 11a, the forward travel range pressure PD is input to the hydraulic oil chamber 11b via the oil paths a1, a3, a5, a8 and a10, and the signal pressure PSR is not input to the hydraulic oil chamber 11f. In addition, in the first forward speed, the second clutch C-2 and the first brake B-1 are not engaged, that is, the engagement pressure PB1 and the engagement pressure PC2 are not generated, and thereby the B2 cut-off valve 13 is set in the left-half position. Furthermore, the B2 relay valve 14 is set in the left-half position because the signal pressure PSB is not input to the hydraulic oil chamber 14a. In addition, the C3 relay valve 12 is set in the right-half position because the forward travel range pressure PD is input to the hydraulic oil chamber 12a and the signal pressure PSR is not input to the hydraulic oil chamber 12f.

From this state, when a control unit (not illustrated) has determined that engine braking is being carried out in the first forward speed, the solenoid valve SB is turned ON, and the B2 relay valve 14 switches to the right-half position, and at the same time, the linear solenoid valve SL4 is driven and controlled by the control unit, the control pressure PSL4 is output from the output port SL4b to the oil paths d1 and d3, the control pressure PSL4 is supplied from the output port 11e of the C3B2 relay valve 11 to the B-2 inner oil chamber 33b via the oil paths e1, e2, j1, l1, and l2 as the engagement pressure PB2 of the second brake B-2, and the second brake B-2 is engaged. Note that because the oil path k2 and the oil path k3 are blocked by the check ball 45, the control pressure PSL4 is also gradually supplied to the B-2 outer oil chamber 33a via the oil paths l3 and l4.

In addition, when a control unit has identified a positive drive state of the first forward speed (the engine braking is no longer in effect), the linear solenoid valve SL4 is controlled, the engagement pressure PB2 of the second brake B-2 is drained via the oil paths l4, l3, l2, l1, j1, e2, e1, d3, and d1 from the drain port SL3d through the check ball valve 28, and the second brake B-2 is disengaged. Subsequently, when the second brake B-2 is completely disengaged, the solenoid valve SB is turned OFF, and the B2 relay valve 14 is switched to the left-half position due to the urging force of the spring 14s.

Note that in the second forward speed and the fourth forward speed, because at least one of the first brake B-1 and the second clutch C-2 is engaged, the B2 cut-off valve 13 is set in the right-half position, the oil path d1 and the oil path e1 are blocked, and at the same time, because the oil path e2 is communicated with the drain port EX, the control pressure PSL4 from the linear solenoid valve SL4 is not supplied to the B-2 outer oil chamber 33a and the B-2 inner oil chamber 33b, and the hydraulic pressure thereof is drained. In addition, even if, for example, the first brake B-1 or the second clutch C-2 are engaged during engine braking in the first forward speed due to some sort of damage, the second brake B-2 is prevented from engaging simultaneously with the first brake B-1 and the second clutch C-2, that is, stalling of the automatic transmission 3 is prevented.

In addition, for example, in this first forward speed, when the linear solenoid valve SL4 is damaged and the control pressure PSL4 is not output, the second brake B-2 cannot engage, but as described above, a positive drive state is ensured by the one-way clutch F-1, and this is sufficient as a limp home function.

In addition, when the driver selects the R position (reverse travel shift position and/or shift range) by using the shift lever and the spool 20p of the manual valve 20 is set to the R range position, and when the reverse speed (REV) has been identified by a control unit (ECU; not illustrated), the solenoid valve SR is turned ON and the solenoid valve SB is turned OFF by electronic commands from the control unit.

Thereby, the C3B2 relay valve 11 is set in the left-half position because, although the modulating pressure PMOD is input to the hydraulic oil chamber 11a, the forward travel range pressure PD is not input to the hydraulic oil chamber 11b and the signal pressure PSR is input to the hydraulic oil chamber 11g. In addition, the C3 relay valve 12 is set to the left-half position because, although the reverse travel range pressure PR is output to the hydraulic oil chamber 12b, the signal pressure PSR is input to the hydraulic oil chamber 12f. In addition, even in the reverse speed, because the second clutch C-2 and the first brake B-1 are not engaged, that is, the engagement pressure PB1 and the engagement pressure PC2 are not generated, the B2 cut-off valve 13 is set in the left-half position. Furthermore, the B2 relay valve 14 is set in the right-half position due to the urging force of the spring 14s because the signal pressure PSB is not output to the hydraulic oil chamber 14a and the reverse travel range pressure PR is not input to the hydraulic oil chamber 14f.

From this state, when the linear solenoid valve SL4 is driven and controlled by the control unit and the control pressure PSL4 from the output port SL4b is output, the control pressure PSL4 is supplied to the hydraulic servo 32 as the engagement pressure PC3 of the third clutch C-3 via the oil paths d1, d3, f1 g1 g2, and g3, while the pulsation is reduced by the damper 23.

In addition, the reverse travel range pressure PR from the manual valve 20 is output from the output port 14e via the oil paths b1, b3, b8 b9, and the input port 14d of the B2 relay valve 14, and the reverse travel range pressure PR is supplied to the oil path k1. Thereby, the reverse travel range pressure PR is supplied to the B-2 inner oil chamber 33b via the oil paths k1 and k4, the check valve 21, and the oil paths l1 and l2, and supplied to the B-2 outer oil chamber 33a via the oil path k2, the check ball 45, and the oil path k3, and the second brake B-2 is engaged.

Subsequently, when the engagement control of the third clutch C-3 by the control pressure PSL4 of the linear solenoid valve SL4 has completed, the solenoid valve SR is turned OFF by the control unit. Thereby, the C3 relay valve 12 is set in the right-half position because the reverse travel range pressure PR is input to the hydraulic oil chamber 12b via the oil path b7, the reverse travel range pressure PR from the B2 relay valve 14 is input to the input port 12e via the oil paths k1, k4, and k5 and supplied from the output port 12d to the hydraulic servo 32 of the third clutch C-3 via the oil paths g1, g2, and g3. Thereby, the third clutch C-3 is maintained in the engaged state by the continuing reverse travel range pressure PR.

However, in this reverse speed, for example, when the linear solenoid valve SL4 is damaged and the control pressure PSL4 is not output, the control unit identifies that the third clutch C-3 is not engaged based on any one of, for example, the input shaft rotation speed, the output shaft rotation speed, or the vehicle speed, or the like. Thereby, the control unit turns the solenoid valve SR OFF as a failure control. Note that this state is the same state during a solenoids-all-OFF failure in which all of the solenoid valves are non-energized due to, for example, a short or a broken wire. In addition, as described above, the reverse travel range pressure PR is supplied to the B-2 outer oil chamber 33a and to the B-2 inner oil chamber 33b of the second brake B-2, and the second brake B-2 is engaged.

When the solenoid valve SR is turned OFF, the C3 relay valve 12 is set in the right-half position because the reverse travel range pressure PR is input to the hydraulic oil chamber 12b via the oil path b7. Thereby, the reverse travel range pressure PR from the B2 relay valve 14 is input to the input port 12e via the oil paths k1, k4, and k5, and then supplied to the hydraulic servo 32 of the third clutch C-3 from the output port 12d via the oil paths g1, g2, and g3. Thereby, although a control pressure that has been linearly modulated is not input, the third clutch C-3 is engaged by the reverse travel range pressure PR. That is, for example, even when the linear solenoid valve SL4 is damaged (during solenoids-all-OFF failure), the reverse speed is established, and a minimum limp home is ensured.

Next, examples of the quick draining will be explained when changing from the R position (reverse travel shift position and/or shift range) to the N position (non-travel shift position and/or shift range) (R-N); when changing from the D position (forward travel shift position and/or shift range) to the N position (non-travel shift position and/or shift range) (D-N); when quickly changing from the R position to the D position via the N position (R-D); and when quickly changing from the D position to the R position via the N position (D-R). Note that in the present specification, the phrase "when changing quickly" denotes, for example, a state in which the shift lever (not illustrated) is stopped for about less than 0.3 seconds in the N position, that is, the case of changing to the next travel shift position and/or shift range before the quick draining has completed. In addition, in the present embodiment, the case of the N position will be explained as the non-travel shift position and/or shift range, but naturally, this is identical for the P position as well.

Figure 6:
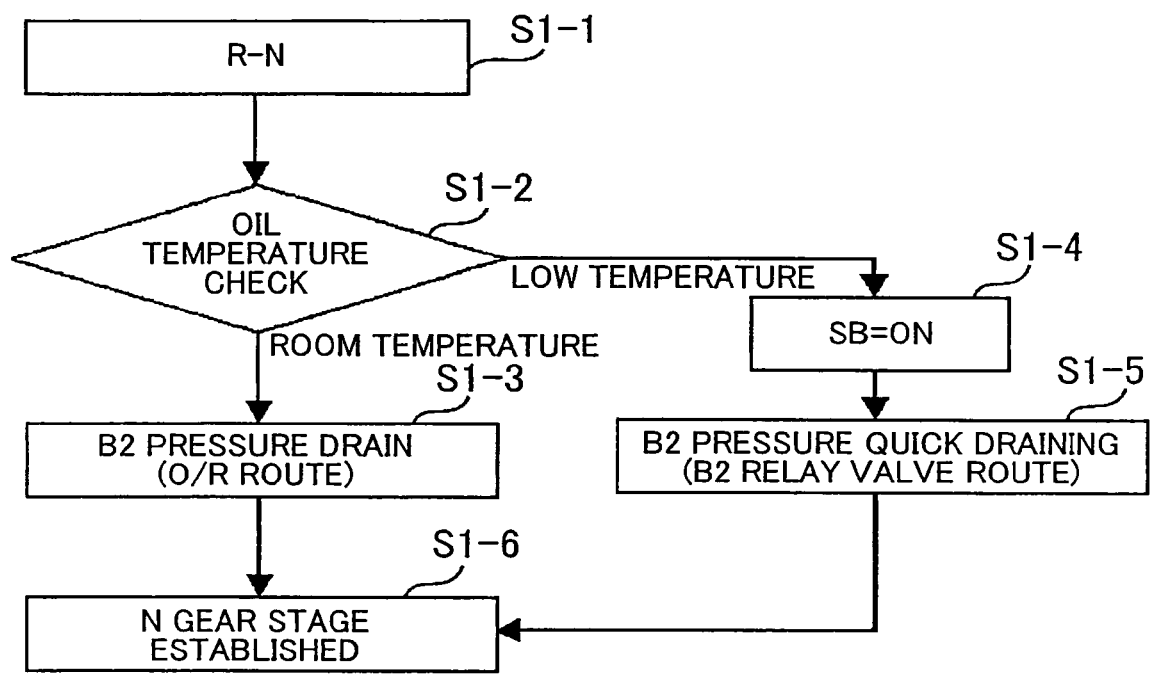
FIG. 6 is a flowchart that shows the operation during R-N shifting.

First, the R-N control when changing from the R position to the N position will be explained with reference to FIG. 4 and FIG. 6. For example, when the driver carries out an operation to select the N position from the R position by using the shift lever, and the control unit identifies a change from the R position to the N position (S1-1), the solenoid valve SR is maintained in the ON state by an electronic command from the control unit, the linear solenoid valve SL4 is turned OFF, the draining of the hydraulic pressure of the hydraulic servo 32 of the third clutch C-3 from the discharge port SL4d of the linear solenoid valve SL4 via the oil paths g3, g1, f1, d3, and d1 is started, and the disengagement of the third clutch C-3 is started.

Next, it is determined whether the oil temperature is, for example, at room temperature (for example, equal to or greater than 10° C.) or a low temperature (for example, less than 10° C.) (S1-2), and when it is determined, for example, that the oil temperature is room temperature, the solenoid valve SB is maintained in an OFF state by an electronic command from the control unit. Thereby, the B2 relay valve 14 remains in the left-half position due to the urging force of the spring 14s, the spool 20p of the manual valve 20 is set in the N range position, and the output port 20d and the drain port EX are communicated. Thus, the B2 relay valve 14 is drained by the check ball valve 25 via the oil paths l4, l3, l2, l1, k4, b9, the orifice 46b, the oil paths b8, b3, b1, and the output port 20d (S1-3). Thereby, the third clutch C-3 and the second brake B-2 are disengaged, and the automatic transmission 3 is set in neutral (the N gear stage) (S1-6).

In addition, when it is determined, for example, that the oil temperature is a low temperature, the solenoid valve SB is turned ON by an electronic command from the control unit (S1-4). Thereby, the B2 relay valve 14 is set in the right-half position because the signal pressure PSB is input to the hydraulic oil chamber 14a. Thus, the hydraulic pressure of the B-2 outer oil chamber 33a and the B-2 inner oil chamber 33b is quickly drained from the drain port EX of the B2 relay valve 14 via the oil paths l4, l3, l1, and k4 (S1-5), and in comparison to the case in which, for example, the hydraulic pressure is drained from the check ball valve 25 via the oil path b9, the orifice 46b, the oil paths b8, b3, and b1, and the output port 20d, the second brake B-2 is quickly disengaged. Of course, thereby, similarly the automatic transmission 3 is set in neutral (N gear stage) (S1-6). Subsequently, the solenoid valve SB is turned OFF after a predetermined time (for example, after 0.3 seconds) during which it is expected that the hydraulic pressure of the B-2 outer oil chamber 33a and the B-2 inner oil chamber 33b will have been completely drained.

Figure 7:
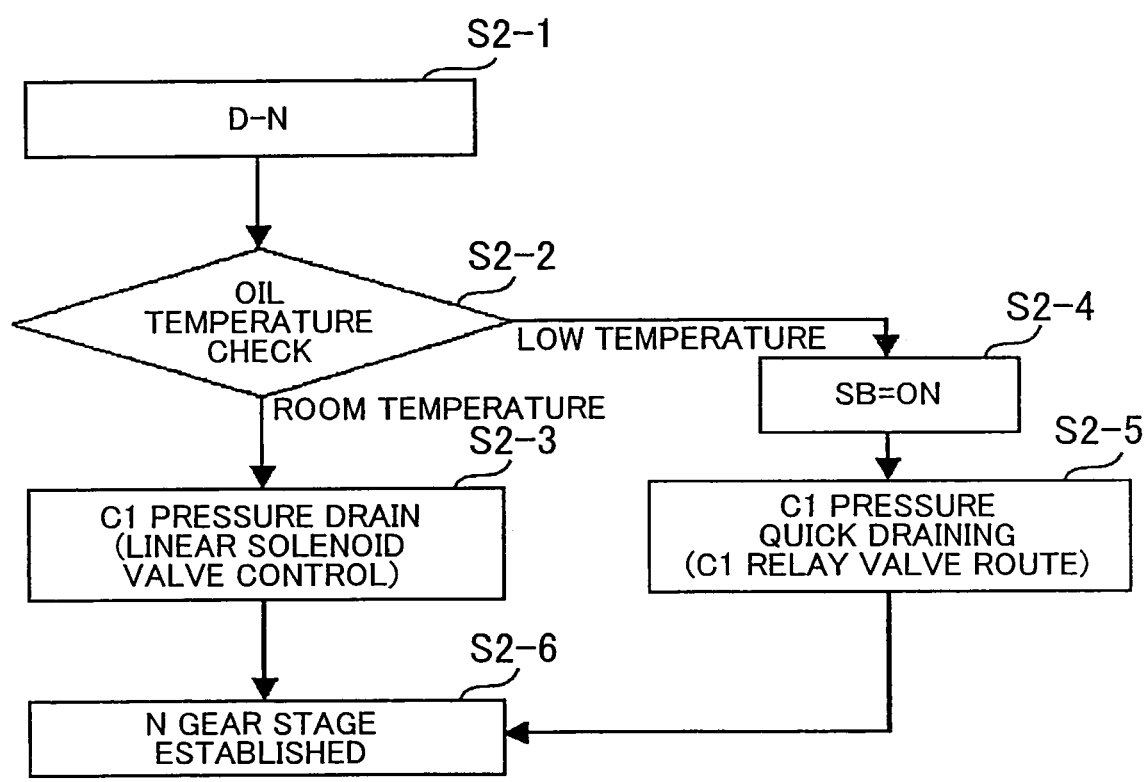
FIG. 7 is a flowchart that shows the operation during D-N shifting.

Next, the D-N control when changing from the D position to the N position will be explained with reference to FIG. 4 and FIG. 7. For example, when the driver carries out an operation to select the N position from the D position by using the shift lever and the control unit has determined that there has been a change from the D position to the N position (S2-1), it is determined whether the oil temperature is, for example, at room temperature (for example, equal to or greater than 10° C.) or a low temperature (for example, 10° C. or less) (S2-2). When it has been determined, for example, that the oil temperature is at room temperature, the state in which the solenoid valve SB has been turned OFF is maintained by an electronic command from the control unit. Thereby, the C1 relay valve 15 is maintained in the left-half position due to the urging force of the spring 14s, and when the solenoid valve SL1 is turned OFF, the hydraulic pressure of the hydraulic servo 31 of the first clutch C-1 is drained from the discharge port SL1d of the linear solenoid valve SL1 via the oil paths c6, c4, and c3 (S2-3). Thereby, the first clutch C-1 is disengaged, and the automatic transmission 3 is changed to neutral (N gear stage) (S2-6).

In contrast, when it has been determined that, for example, the oil temperature is a low temperature, the solenoid valve SB is turned ON by an electronic command from the control unit (S2-4). Thereby, the C1 relay valve 15 is set in the right-half position because the signal pressure PSB is input to the hydraulic oil chamber 15a. Thus, the output port 15c and the connection port 15d of the C1 relay valve 15 are communicated, the spool 20p of the manual valve 20 is set in the N range position, and the output ports 20b and 20c and the drain port EX are communicated. Thus, the hydraulic pressure of the hydraulic servo 31 of the first clutch C-1 is quickly drained from the check ball valve 26 through the oil paths c6, c4, a4, a3, and a1, and the first clutch C-1 is disengaged quickly in comparison to the case in which, for example, the hydraulic pressure is drained from the check ball valve 27 via the oil paths c6, c4, c3, and the linear solenoid valve SL1. Of course, thereby, similarly the automatic transmission 3 changes to neutral (N gear stage) (S2-6). Subsequently, the solenoid valve SB is switched OFF after a predetermined time (for example, 0.3 seconds) during which it is expected that the hydraulic pressure of the hydraulic servo 31 of the first clutch C-1 will have been completely drained.

Figure 8:
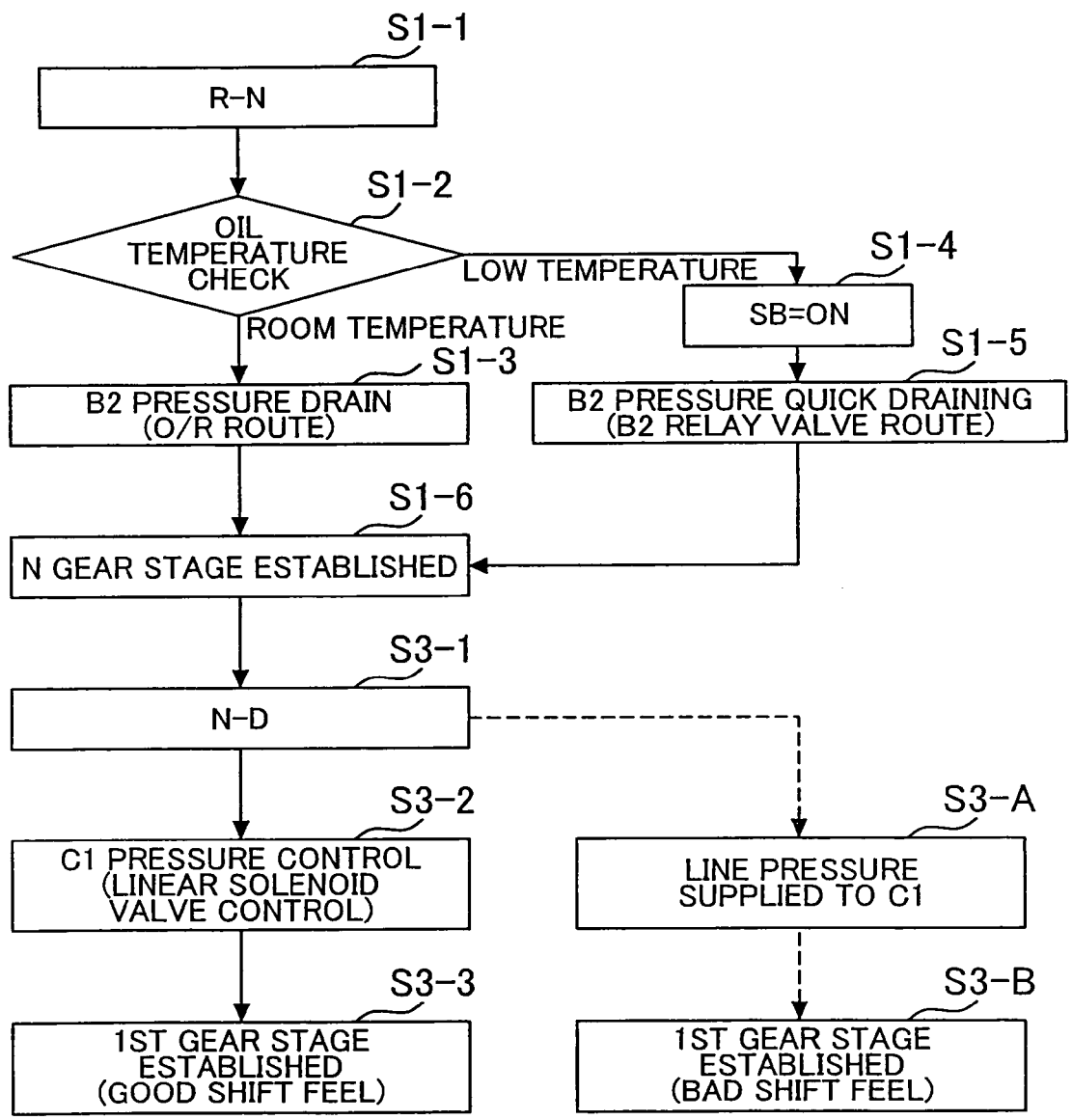
FIG. 8 is a flowchart that shows the operation during R-D shifting.

Next, the case of changing quickly to the D position from the R position via the N position (R-D) will be explained with reference to FIG. 4 and FIG. 8. When, for example, the driver quickly changes to the D position from the R position via the N position by using the shift lever, first, because the N position is detected by the control unit, R-N control is carried out. Note that steps S1-1 to S1-6 in FIG. 8 are identical to those that have been described above, and thus their explanation has been omitted.

Here, when, for example, during the R-N control described above, it is determined that the oil temperature is a low temperature and quick draining has been carried out by turning on the solenoid valve SB ON (S1-4, S1-5), even when the D position has been identified before the solenoid valve SB is turned OFF, it is necessary to immediately engage the first clutch C-1. However, when, for example, the C1 relay valve 15 is set in the position for quick draining, that is, the right-half position, by using the signal pressure PSB of the solenoid valve SB, the output port 15c and the connecting port 15d are communicated, and thus the line pressure PL that is supplied to the input port 20a of the manual valve 20 is supplied to the hydraulic servo 31 of the first clutch C-1 as the forward travel range pressure PD via the oil paths a1, a3, a4, c4, and c6 (S3-A). Thus, although the first forward speed is established by engaging the first clutch C-1, the first clutch C-1 is rapidly engaged due to the line pressure PL and engagement shock occurs, that is, the shift feel is bad (S3-B).

Thus, in the present hydraulic control apparatus 10, when the control unit has identified N-D control (S3-1), first, the solenoid valve SR is turned ON, the input port 12f and the output port 12g of the C3 relay valve 12 are communicated, the forward travel range pressure PD from the output ports 20b and 20c of the manual valve 20 is input to oppose the signal pressure PSB to the hydraulic oil chamber 15e of the C1 relay valve 15 via the oil paths a1, a2, a5, a6, and a7 (the second forward travel range pressure oil paths). Thereby, the C1 relay valve 15 is set in the left-half position irrespective of the input state of the signal pressure PSB, the oil paths c1, c3, c4, and c6 (the forward travel engagement paths, the control pressure supply oil paths) are communicated, and as described above, the control pressure PSL1 of the linear solenoid valve SL1 is supplied to the hydraulic servo 31 of the first clutch C-1 (S3-2). That is, because the engagement pressure PC1 that is supplied to the hydraulic servo 31 of the first clutch C-1 is smoothly controlled by the linear solenoid valve SL1 to establish the first forward speed, the shift feel is good (S3-3).

Note that the check ball valve (delay device) 42 is disposed on the oil path a4, and that the supplying of the forward travel range pressure PD from the oil path a4 to the oil path c4 is delayed. Thus, before the forward travel range pressure PD is supplied to the hydraulic servo 31 of the first clutch C-1 from the oil path a4 via the oil path c4, the forward travel range pressure PD is input to the hydraulic oil chamber 15e of the C1 relay valve 15 via the oil paths a1, a2, a5, a6, and a7. Thereby, the forward travel range pressure PD is supplied to the hydraulic servo 31 of the first clutch C-1, and the prevention of the occurrence of quick engagement as described above can be realized.

In addition, after the first forward speed has been established and the quick draining of the second brake B-2 has been completed in this manner, the solenoid valve SB and the solenoid valve SR are turned OFF. The forward travel range pressure PD is input to the hydraulic oil chamber 12a via the oil paths a1, a3, a5, a8, and a9 (the third forward travel range pressure oil paths), and when the solenoid valve SR is turned OFF and the signal pressure PSR is not input to the hydraulic oil chamber 12j, the C3 relay valve 12 switches from the left-half position to the right-half position. Thereby, the oil path a6 and the oil path a7 (the second forward travel range pressure oil path) are blocked by the C3 relay valve 12, the signal pressure PSB is not input to the hydraulic oil chamber 15a of the C1 relay valve 15, and at the same time, the forward travel range pressure PD is not input to the hydraulic oil chamber 15e, and the C1 relay valve 15 is maintained in the left-half position due to the urging force of the spring 15s. In this manner, by blocking the forward travel range pressure PD from entering the hydraulic oil chamber 15e of the C1 relay valve 15, during the next D-N control, when the solenoid valve SB is turned ON, it is possible to switch to the right-half position by inputting the signal pressure PSB to the hydraulic oil chamber 15a, that is, it is possible to enable quick draining during the next D-C control.

Figure 9:
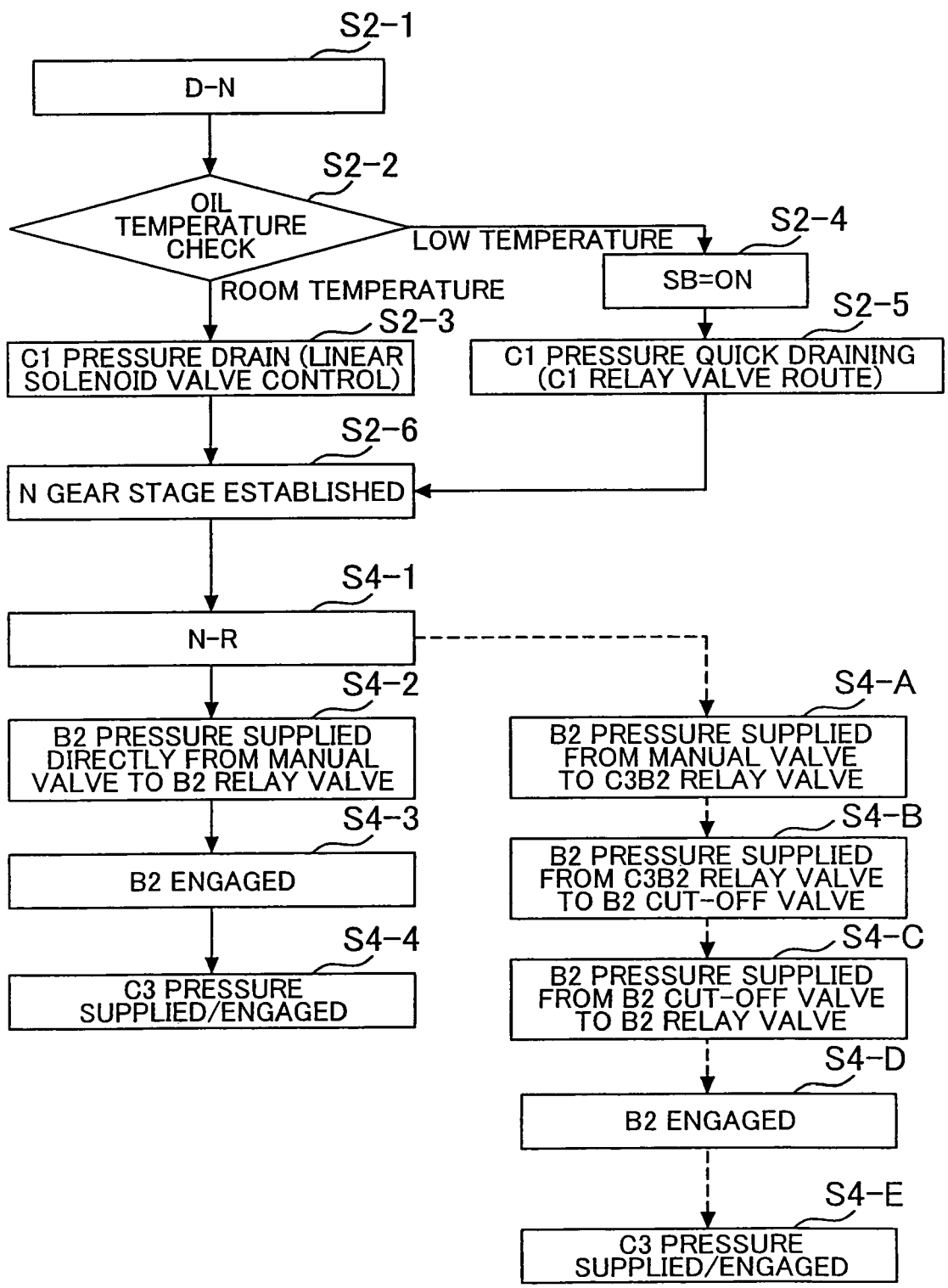
FIG. 9 is a flowchart that shows the operation during D-R shifting.

Next, changing quickly from the D position to the R position via the N position (D-R) will be explained with reference to FIG. 4 and FIG. 9. When, for example, the driver quickly changes from the D position to the R position via the N position by using the shift lever, first, because the N position is detected by the control unit, D-N control is carried out. Note that steps S2-1 to S2-6 in FIG. 9 are identical to those that have been described above, and thus their explanation has been omitted.

Here, when, for example, during the D-N control described above it has been determined that the oil temperature is low, and quick draining has been carried out by turning the solenoid valve SB ON (S2-4, S2-5), even when the R position is identified before the solenoid valve SB is turned OFF, it is necessary to immediately engage the second brake B-2. However, when, for example, the B2 relay valve 14 is in the position for quick draining, that is, the right-half position, due to the signal pressure PSB of the solenoid valve SB, the input port 14d and the output port 14e are blocked, and the oil path b9 and the oil path k1 (the reverse travel engagement oil path, the first reverse travel range pressure oil path) are blocked.

When in this state, the reverse travel range pressure PR is supplied to the input port 11c of the C3B2 relay valve 11 via the oil paths b1 and b2 (S4-A), the reverse travel range pressure PR is supplied from the output port 11e of the C3B2 relay valve 11 to the input port 13c of the B2 cut-off valve 13 via the oil path e1 (S4-B), and then supplied from the output port 13d of the B2 cut-off valve 13 to the input port 14c of the B2 relay valve 14 via the oil path e2 (S4-C). The second brake B-2 is engaged by supplying the reverse travel range pressure PR to the B-2 outer oil chamber 33a and the B-2 inner oil chamber 33b from the output port 14b of the B2 relay valve 14 via the oil paths j1, l1, l2, l3, and l4 (S4-D), and subsequently, as described above, the third clutch C-3 is engaged due to the control pressure PSL4 of the linear solenoid valve SL4 (S4-E). Thus, the time until the reverse speed is established is delayed, and a time lag occurs until the reverse speed is established after changing to the R range.

Thus, in the hydraulic control apparatus 10, when the control unit identifies N-R control (S4-1), first, the solenoid valve SB is turned ON, the input port 12h and the output port 12i of the C2 relay valve 12 are communicated, and the reverse travel range pressure PR from the output port 20d of the manual valve 20 is input to the hydraulic oil chamber 14f of the B2 relay valve 14 via the oil paths b1, b3, b4, b5, and b6 (the second reverse travel range pressure oil paths) to counter the signal pressure PSB. In addition, the reverse travel range pressure PR is directly supplied to the input port 14d of the B2 relay valve 14 via the oil paths b1, b3, b8 and b9 (S4-2). Thereby, the B2 relay valve 14 is set in the left-half position irrespective of the input state of the signal pressure PSB, the oil paths b1, b3, b8, b9, k1, k2, k3, k4, l1, l2, l3, and l4 (the reverse travel engagement oil paths, the first reverse travel range pressure oil paths) are communicated, and as described above, the reverse travel range pressure PR is supplied to the B-2 outer oil chamber 33a and the B-2 inner oil chamber 33b, and the second brake B-2 is engaged (S4-3). In addition, subsequently, as described above, the third clutch C-3 is engaged due to the control pressure PSL4 of the linear solenoid valve SL4 (S4-4). Thereby, the timing lag that was described above does not occur, and the reverse speed is quickly established.

In addition, after the reverse speed has been established in this manner and the quick draining of the first clutch C-1 has completed, the solenoid valve SB and the solenoid valve SR are turned OFF. When the reverse travel range pressure PR is input to the hydraulic oil chamber 12b via b1, b3, b4, and b7 (the third reverse travel range pressure oil paths) to the C3 relay valve 12, the solenoid valve SR is turned OFF, and the signal pressure PSR is not input to the hydraulic oil chamber 12j, the C3 relay valve 12 is switched from the left-half position to the right-half position. Thereby, the oil path b5 and the oil path b6 (the second reverse travel range pressure oil paths) are blocked by the C3 relay valve 12, the signal pressure PSB is not input to the hydraulic oil chamber 14a of the B2 relay valve 14, and at the same time, the reverse travel range pressure PR is not input to the hydraulic oil chamber 14f, and the B2 relay valve 14 is maintained in the left-half position due to the urging force of the spring 14s. In this manner, by blocking the reverse travel range pressure PR to the hydraulic oil chamber 14f of the B2 relay valve 14, during the next R-N control, when the solenoid valve SB is turned ON, it is possible to switch the B2 relay valve 14 to the right-half position by inputting the signal pressure PSB to the hydraulic oil chamber 14a, that is, it is possible to carry out the quick draining during the next R-N control.

As explained above, according to the hydraulic control apparatus 10 for an automatic transmission according to the present invention, when changing from a reverse travel shift position and/or shift range to a non-travel shift position and/or shift range, and when changing from a forward travel shift position and/or shift range to a non-travel shift position and/or shift range, by changing the output state of the signal pressure PSB of the solenoid valve SB, the B2 relay valve 14 and the C1 relay valve 15 are switched to the discharge position (the right-half position in FIG. 4), and the quick draining of the hydraulic pressure of the hydraulic servo 33 of the second brake B-2 and the hydraulic pressure of the hydraulic servo 31 of the first clutch C-1 is carried out. Thereby, in both of the cases of changing from the reverse travel shift position and/or shift range to a non-travel shift position and/or shift range and changing from the forward travel shift position and/or shift range to a non-travel shift position and/or shift range, it is possible to carry out quick draining with only one solenoid valve, that is, the solenoid valve SB. It is thus possible to realize cost reductions, and it is possible to realize the prevention of shift shock because simultaneous engagement due to the mistiming of the control of, for example, two solenoid valves does not occur.

In addition, at least when the oil temperature is low, quick draining is carried out by changing the output state of the signal pressure PSB of the solenoid valve SB, and thus it is possible to prevent draining delays caused by a high oil viscosity and residual engagement from occurring in the second brake B-2 and the first clutch C-1.

In addition, the oil paths c1, c3, c4, and c6 are oil paths that supply the control pressure PSL1 of the linear solenoid valve SL1 to the hydraulic servo 31 of the first clutch C-1 as the engagement pressure PC1, and thus when the hydraulic pressure of the hydraulic servo 31 of the first clutch C-1 is drained due to the pressure regulating action of the linear solenoid valve SL1, there is, in particular, a concern that the draining will be slow when the oil temperature is low. However, because it is possible to carry out quick draining by switching the C1 relay valve 15, it is possible to realize the prevention of residual engagement.

Furthermore, when the C1 relay valve 15 is in the right-half position, which is the discharge position, the C1 relay valve 15 is connected to the oil paths a1, a3, and a4, which communicate the oil paths c4 and c6 up to the hydraulic servo 31 of the first clutch C-1 and the output ports 20b and 20c of the manual valve 20, and thus it is possible to carry out the draining of the forward travel range pressure PD and the quick draining of the hydraulic pressure of the hydraulic servo 31 of the first clutch C-1 via the output ports 20b and 20c of the manual valve 20.

In addition, the C1 relay valve 15 is connected to the oil paths a1, a2, a5, a6, and a7, which supply the forward travel range pressure PD, so as to urge the C1 relay valve 15 in the left-half position, which is the engagement position, when changing from a non-travel shift position and/or shift range to a forward travel shift position and/or shift range. When, for example, the driver quickly changes from the reverse travel shift position and/or shift range to a forward travel shift position and/or shift range, the B2 relay valve 14 is switched to the right-half position, which is the discharge position, because the signal pressure PSB of the solenoid valve SB is output, and the C1 relay valve 15 can be switched to the left-half position by the forward travel range pressure PD, irrespective of the signal pressure PSB of the solenoid valve SB. Thereby, it is possible to carry out the engagement of the first clutch C-1 by supplying the engagement pressure PC1 to the hydraulic servo 31 of the first clutch C-1 while carrying out the quick draining of the hydraulic pressure of the hydraulic servo 33 of the second brake B-2.

Furthermore, the check ball valve 42 is provided that is interposed on the oil paths a1, a3, and a4, and delays the forward travel range pressure PD that is supplied from the oil paths a1, a3, and a4 to the C1 relay valve 15 so as to be later than the forward travel range pressure PD that is supplied from the oil paths a1, a3, and a4 to the C1 relay valve 15. Thus, before the forward travel range pressure PD, which is supplied from the oil paths a1, a3, and a4, is supplied to the hydraulic servo 31 of the first clutch C-1, it is possible to switch the C1 relay valve 15 to the left-half position by using the forward travel range pressure PC from the oil paths a1, a2, a5, a6, and a7. Thereby, for example, the forward travel range pressure PD is not supplied to the hydraulic servo 31 of the first clutch C-1 by causing a reverse flow in the oil paths a1, a3, and a4, which are for carrying out quick draining, and it is possible to supply the engagement pressure PC1 to the hydraulic servo 31 of the first clutch C-1 via the original oil paths c1, c3, c4, and c6. That is, it is possible to prevent the occurrence of the sudden engagement of the first clutch C-1 due to the forward travel range pressure PD being suddenly supplied to the hydraulic servo 31 of the first clutch C-1.

In addition, a C3 relay valve 12 is provided that is interposed on the oil paths a1, a2, a5, a6, and a7, and that is connected to the oil paths a1, a3, a5, a8, and a9, which supply the forward travel range pressure PD, switches to the left-half position, which is the communicating position, that communicates the oil paths a1, a2, a5, a6, and a7 when in a non-travel shift position and/or shift range, inputs the forward travel range pressure PD from the oil paths a1, a3, a5, a8, and a9 when in the forward travel shift position and/or shift range, and switches to the right-half position, which is the blocking position, that blocks the oil paths a1, a2, a5, a6 and a7 due to the urging of the forward travel range pressure PD from the oil paths a1, a3, a5, a8, and a9 after the engagement of the first clutch C-1. Thus, it is possible to switch the C1 relay valve 15 to the left-half position irrespective of the signal pressure PSB of the solenoid valve SB by supplying the forward travel range pressure PD from the oil paths a1, a2, a5, a6, and a7 to the C1 relay valve 15 when changing from the non-travel shift position and/or shift range to a forward travel shift position and/or shift range, and the oil paths a1 a2, a5, a6, and a7 are blocked after the engagement of the first clutch C-1. Thus, when changing from a forward travel shift position and/or shift range to another shift position and/or shift range, it is possible to switch the C1 relay valve 15 to the right-half position by using the signal pressure PSB of the solenoid valve SB, and it is possible to carry out quick draining.

In addition, the oil paths b1, b3, b8, b9, k1, k2, k3, k4, l1, l2, l3, and l4 are oil paths that supply the reverse travel range pressure PR to the hydraulic servo 33 of the second brake B-2 as the engagement pressure PB2, and thus, in particular, when the oil temperature is low, there is a concern that the draining will become slow. However, because the quick draining is carried out by the switching of the B2 relay valve 14, it is possible to realize the prevention of the residual engagement.

In addition, the B2 relay valve 14 is connected to the oil paths b1, b3, b4, b5, and b6, which supply the reverse travel range pressure PR so as to urge the B2 relay valve 14 toward the left-half position side, which is the engagement position, when changing from a non-travel shift position and/or shift range to the reverse travel shift position and/or shift range. When, for example, the driver changes quickly from the forward travel shift position and/or shift range to the reverse travel shift position and/or shift range, it is possible to switch the C1 relay valve 15 to the right-half position by outputting the signal pressure PSB of the solenoid valve SB, and to switch the B2 relay valve 14 to the left-hand position by using the reverse travel range pressure PR irrespective of the signal pressure PSB of the solenoid valve SB. Thereby, it is possible to carry out the engagement of the second brake B-2 by supplying the engagement pressure PB2 to the hydraulic servo 33 of the second brake B-2 while carrying out the quick draining of the hydraulic pressure of the hydraulic servo 31 of the first clutch C-1.

Furthermore, a C3 relay valve 12 is provided that is interposed on the oil paths b1, b3, b4, b5, and b6, and that is connected to the oil paths b1, b3, b4, and b7, which supply the reverse travel range pressure PR, switches to the left-half position, which is the communicating position, that communicates the oil paths b1, b3, b4, b5, and b6 when in a non-travel shift position and/or shift range, inputs the reverse travel range pressure PR from the oil paths b1, b3, b4, and b7 when in the reverse travel shift position and/or shift range, and switches to the right-half position, which is the blocking position, that blocks the oil paths b1, b3, b4, b5 and b6 due to the urging of the reverse travel range pressure PR from the oil paths b1, b3, b4, and b7, after the engagement of the second brake B-2. Thus, when changing from a non-travel shift position and/or shift range to the reverse travel shift position and/or shift range, it is possible to switch the B2 relay valve 14 to the left-half position irrespective of the signal pressure PSB of the solenoid valve SB by supplying the reverse travel range pressure PR from the oil paths b1, b3, b4, b5, and b6 to the B2 relay valve 14, and the oil paths b1, b3, b4, b5, and b6 are blocked after the engagement of the second brake B-2. Thus, when changing from the reverse travel shift position and/or shift range to another shift position and/or shift range, it is possible to switch the B2 relay valve 14 to the right-half position by using the signal pressure PSB of the solenoid valve SB, and it is possible to carry out quick draining.

In addition, the C3 relay valve 12 is provided with a secure valve that is interposed between the linear solenoid valve SL4, the hydraulic servo 32 of the third clutch C-3, and the output port 20d of the manual valve 20, communicates the linear solenoid valve SL4 and the hydraulic servo 32 of the third clutch C-3 when in the left-half position, communicates the output port 20d of the manual valve 20 and the hydraulic servo 32 of the third clutch C-3 when in the right-half position, switches to the left-half position when the signal pressure PSR of the solenoid valve SR is input irrespective of the reverse travel range pressure PR from the oil path 7b, switches to the right-half position when the signal pressure PSR of the solenoid valve SR is not input by using the reverse travel range pressure PR of the oil path b7, and supplies the reverse travel range pressure PR to the hydraulic servo 32 of the third clutch C-3 when the linear solenoid valve SL4 is damaged. Thus, it is possible to carry out the switching of the communicating and blocking of the oil paths a1, a2, a5, a6, and a7 and the oil paths b1, b3, b4, b5, and b6 without newly providing other switching valves, that is, it is possible to reduce the number of switching valves by using them in common, and it is possible to downsize and reduce costs.

Furthermore, the hydraulic control apparatus 10 of the automatic transmission of the present invention can be applied to the hybrid drive apparatus 1. In addition, in the hybrid drive apparatus 1, when, for example, switching from a non-travel shift position and/or shift range to a forward travel shift position and/or shift range, or to the reverse travel shift position and/or shift range, the rise of the torque output of the first and second motors M1 and M2 is fast compared to that of the internal combustion engine 4, and when residual engagement occurs in the first clutch C-1 and the second brake B-2, shift shock occurs. However, according to the present invention, quick draining of the hydraulic servo 31 of the first clutch C-1 and the hydraulic servo 33 of the second brake B-2 is possible, and thus it is possible to realize the prevention of shift shock.

Note that in the embodiment that has been explained above, an explanation was provided in which the hydraulic control apparatus 10 for an automatic transmission was applied to the hybrid drive apparatus 1, but of course, the present invention may also be applied to an automatic transmission in which only an internal combustion engine serves as the drive source. In addition, as an automatic transmission, an explanation was provided of one in which four forward speeds and one reverse speed are established, but this is not limiting, and the automatic transmission may be of any type provided that it is one in which a engaging element that engages during forward travel and a engaging element that engages during reverse travel are provided.

In addition, the present embodiment that has been explained is one in which the second brake B-2 serves as the reverse travel engaging element and the first clutch C-1 serves as the forward travel engaging element, but this is not limiting, and the present invention can be applied provided that a reverse travel engaging element and a forward travel engaging element are provided.

The hydraulic control apparatus, for an automatic transmission, according to the present invention and the hybrid drive apparatus that is provided with the same may be used in automatic transmissions that are mounted in vehicles, trucks, buses, agricultural machinery and the like, and hybrid drive apparatuses, in particular, and may be advantageously used in ones that require quick draining during the switching of the forward and reverse travel shift position and/or shift ranges, enable cost reductions, and provide for the prevention of shift shock.

According to an exemplary aspect of the invention, the first switch valve and the second switch valve are switched to a discharge position to enable carrying out of the quick draining of the hydraulic pressure of the hydraulic servo of the reverse travel engaging element and the hydraulic pressure of the hydraulic servo of the forward travel engaging element by changing an output state of the signal pressure of the first signal electromagnetic valve when changing from the reverse travel shift position and/or shift range to the non-travel shift position and/or shift range and when changing from the forward travel shift position and/or shift range to the non-travel shift position and/or shift range. Thus, only a single electromagnetic valve, that is, the first signal electromagnetic valve, is required. It is thus possible to realize cost reductions, and it is possible to prevent shift shock because, for example, the simultaneous engagement of two electromagnetic valves due to mistiming does not occur while carrying out the quick draining in both the cases of changing from the reverse travel shift position and/or shift range to the non-travel shift position and/or shift range, and changing from the forward travel shift position and/or shift range to the non-travel shift position and/or shift range.

According to an exemplary aspect of the invention, quick draining is carried out by changing the output state of the signal pressure of the first electromagnetic valve at least when the oil temperature is low. It is thus possible to prevent the draining from being delayed due to the viscosity of the oil being high and the occurrence of residual engagement.

According to an exemplary aspect of the invention, the forward travel oil paths are control pressure supply oil paths that supply the control pressure of the first pressure regulating electromagnetic valve to the hydraulic servo of the forward travel engaging element as an engagement pressure. When the hydraulic pressure of the hydraulic servo of the forward travel engaging element is drained by using the pressure regulating action of the first pressure regulating electromagnetic valve, although there is a concern that draining will become slow in particular while the oil temperature is low, it is possible to realize the prevention of residual engagement because quick draining is carried out by the switching of the second switching valve.

According to an exemplary aspect of the invention, the second switching valve is connected to the first forward travel range pressure oil paths that communicate with the forward travel engagement oil path up to the hydraulic servo of the forward travel engaging element and the forward travel range pressure port when in the discharge position. Via the forward travel range pressure output ports of the range pressure switching valve, it is possible to carry out the draining the forward travel range pressure and to carry out the quick draining of the hydraulic pressure of the hydraulic servo of the forward travel engaging element.

According to an exemplary aspect of the invention, the second switching valve is connected to the second forward travel pressure oil paths that supply the forward travel range pressures so as to urge the second switching valve toward the engagement position side when changing from the non-travel shift position and/or shift range to the forward travel shift position and/or shift range. Thus, for example, when the driver suddenly changes from the reverse travel shift position and/or shift range to the forward travel shift position and/or shift range, it is possible to switch the first switching valve to the discharge position by outputting the signal pressure of first signal electromagnetic valve, and, irrespective of the signal pressure of the first signal electromagnetic valve, it is possible to switch the second switching valve to the engagement position by using the forward travel range pressure. Thereby, it is possible to carry out the engagement of the forward travel engaging element by supplying an engagement pressure to the hydraulic servo of the forward travel engaging element while carrying out the quick draining of the hydraulic pressure of the hydraulic servo of the reverse travel engaging element.

According to an exemplary aspect of the invention, a delay device is provided that is interposed on the first forward travel range pressure oil paths and delays the forward travel range pressure that is supplied from the first forward travel range pressure oil paths to the second switching valve so as to be later than the forward travel range pressure that is supplied from the second forward travel range pressure oil path to the second switching valve. Before the forward travel range pressure that is supplied from the first forward travel range pressure oil paths is supplied to the hydraulic servo of the forward travel engaging elements, it is possible to switch the second switching valve to the engagement position by using the forward travel range pressure from the second forward travel range pressure oil paths. Thereby, it is possible to supply the engagement pressure to the hydraulic servo of the forward travel engaging element via the original forward travel engagement oil paths without, for example, the forward travel range pressure being supplied to the hydraulic servo of the forward travel engaging element by reversing the flow of the first forward travel range pressure oil path in order to carry out quick draining. That is, it is possible to prevent the occurrence of the sudden engagement of the forward travel engaging element due to the forward travel range pressure being suddenly supplied to the hydraulic servo of the forward travel engaging element.

According to an exemplary aspect of the invention, a third switching valve is provided that is interposed on the second forward travel range pressure oil paths and is connected to the third forward travel range pressure oil paths that supply the forward travel range pressure, switches to a communicating position that communicates with the second forward travel range pressure oil paths while in the non-travel shift position and/or shift range, inputs the forward travel range pressure from the third forward travel range pressure oil paths while in the forward travel shift position and/or shift range, and switches to the blocking position that blocks the second forward travel range pressure oil paths due to the urging of the forward travel range pressure from the third forward travel range pressure oil paths after the engagement of the forward travel engaging element. Thus, it is possible to switch the second switching valve to the engagement position irrespective of the signal pressure of the first signal electromagnetic valve by supplying the forward travel range pressure from the second forward travel range pressure oil paths to the second switching valve when changing from the non-travel shift position and/or shift range to the forward travel shift position and/or shift range, and after the engagement of the forward travel engaging element, it is possible to switch the second switching valve to the discharge position by using the signal pressure of the first signal electromagnetic valve when changing from the forward travel shift position and/or shift range to another shift position and/or shift range because the second forward travel range pressure oil paths are blocked, and it is possible to carry out quick draining.

According to an exemplary aspect of the invention, although there is a concern that the draining of the reverse travel engagement oil paths will become slow, in particular when the oil temperature is low, because the reverse travel engagement oil paths are the first reverse travel range pressure oil paths that supply the reverse travel range pressure to the hydraulic servo of the reverse travel engaging element as the engagement pressure, it is possible to carry out the quick draining by the switching of the second switching valve, and thus it is possible to realize the prevention of residual engagement.

According to an exemplary aspect of the invention, the first switching valve is connected to the second reverse travel range pressure oil paths that supply the reverse travel range pressure so as to urge the first switching valve toward the engagement position side when changing from the non-travel shift position and/or shift range to the reverse travel shift position and/or shift range. When, for example, the driver quickly changes from the forward travel shift position and/or shift range to the reverse travel shift position and/or shift range, it is possible to switch the second switching valve to the discharge position by outputting the signal pressure of the first signal electromagnetic valve, and, irrespective of the signal pressure of the first signal electromagnetic valve, it is possible to switch the first switching valve to the engagement position by using the reverse travel range pressure. Thereby, it is possible to carry out the engagement of the reverse travel engaging element by supplying engagement pressure to the hydraulic servo of the reverse travel engaging element while carrying out the quick draining of the hydraulic pressure of the hydraulic servo of the forward travel engaging element.

According to an exemplary aspect of the invention, a third switching valve is provided that is interposed on the second reverse travel range pressure oil paths and is connected to the third reverse travel range pressure oil paths that supplies the reverse travel range pressure, switches to a communicating position that communicates with the second reverse travel range pressure oil paths when in the non-travel shift position and/or shift range, inputs the reverse travel range pressure from the third reverse travel range pressure oil paths when in the reverse travel shift position and/or shift range, and switches to a blocking position that blocks the second reverse travel range pressure oil paths due to the urging of the reverse travel range pressure from the third reverse travel range pressure oil paths after the engagement of the reverse travel engaging element. Thus, irrespective of the signal pressure of the first signal electromagnetic valve, it is possible to switch the first switching valve to the engagement position by supplying the reverse travel range pressure from the second reverse travel range pressure oil paths to the first switching valve when changing from a non-travel shift position and/or shift range to the reverse travel shift position and/or shift range, and after the engagement of the reverse travel engaging element, it is possible to switch the first switching valve to the discharge position by using the signal pressure of the first signal electromagnetic valve when changing from the reverse travel shift position and/or shift range to another shift position and/or shift range because the second reverse travel range pressure oil paths are blocked, and it is possible to carry out quick draining.

According to an exemplary aspect of the invention, the third switching valve is a secure valve that is interposed between the second pressure regulating electromagnetic valve, the hydraulic servo of the reverse travel clutch, and the reverse travel range pressure output port of the range pressure switching valve, communicates the second pressure regulating electromagnetic valve and the hydraulic servo of the reverse travel clutch when in the communicating position, communicates the reverse travel range pressure output port of the range pressure switching valve and the hydraulic servo of the reverse travel clutch while in the blocking position, switches to the communicating position irrespective of the reverse travel range pressure from the third reverse travel range pressure oil paths when the signal pressure of the second signal electromagnetic valve is input, switches to the blocking position by using the reverse travel range pressure from the third reverse travel range pressure oil paths when the signal pressure of the second signal electromagnetic valve is not input, and supplies the reverse travel range pressure to the hydraulic servo of the reverse travel clutch even when the second pressure regulating electromagnetic valve is damaged. Thus, it is possible to carry out the switching of the communication and the blocking of the second reverse travel range pressure oil paths without newly providing other switching valves, that is, it is possible to decrease the number of the switching valves by sharing, and it is possible to realize downsizing and cost reductions.

According to an exemplary aspect of the invention, it is possible to apply the hydraulic control apparatus, for the automatic transmission, of the present invention to a hybrid drive apparatus. In addition, in a hybrid drive apparatus, when, for example, switching from the non-travel shift position and/or shift range to the forward travel shift position and/or shift range or the reverse travel shift position and/or shift range, the rise of the torque output of the first and second motors may be more rapid in comparison to that of the internal combustion engine, and shift shock may occur when residual engagement occurs in the forward travel engaging element and the reverse travel engaging element. However, because quick draining with respect to the hydraulic servo of the forward travel engaging element and the hydraulic servo of the reverse travel engaging element according to the present invention is possible, it is possible to realize the prevention of shift shock.

What is claimed is:
1. A hydraulic control apparatus for an automatic transmission, comprising:
    a forward travel engaging element that engages when changing from a non-travel shift position or shift range to a forward travel shift position or shift range and disengages when changing from the forward travel shift position or shift range to the non-travel shift position or shift range;
    a reverse travel engaging element that engages when changing from the non-travel shift position or shift range to a reverse travel shift position or shift range and disengages when changing from the reverse travel shift position or shift range to the non-travel shift position or shift range;
    a first signal electromagnetic valve that can output a signal pressure;
    a first switching valve that is interposed on a reverse travel engagement oil path that supplies an engagement pressure to a hydraulic servo of the reverse travel engaging element, and that switches between an engagement position that communicates the reverse travel engagement oil path and a discharge position that enables quicker draining than by simply draining using the reverse travel engagement oil path based on an output state of the signal pressure of the first signal electromagnetic valve; and
    a second switching valve that is interposed on a forward travel engagement oil path that supplies an engagement pressure to a hydraulic servo of the forward travel engaging element, and that switches between an engagement position that communicates the forward travel engagement oil path and a discharge position that enables quicker draining than by simply draining using the forward travel engagement oil path based on the output state of the signal pressure of the first signal electromagnetic valve, wherein:
        the hydraulic control apparatus is structured so as to change the output state of the signal pressure of the first signal electromagnetic valve when changing from the reverse travel shift position or shift range to the non-travel shift position or shift range and when changing from the forward travel shift position or shift range to the non-travel shift position or shift range, and to enable quick draining of hydraulic pressure of the hydraulic servo of the reverse travel engaging element and hydraulic pressure of the hydraulic servo of the forward travel engaging element.

2. The hydraulic control apparatus according to claim 1, wherein quick draining is carried out by changing the output state of the signal pressure of the first electromagnetic valve at least when oil temperature is low.

3. The hydraulic control apparatus according to claim 2, comprising:
    a first pressure regulating electromagnetic valve that can supply a regulated control pressure to the hydraulic servo of the forward travel engaging element; wherein:
        the forward travel engagement oil path is a control pressure supply path that supplies the control pressure of the first pressure regulating electromagnetic valve to the hydraulic servo of the forward travel engaging element as the engagement pressure.

4. The hydraulic control apparatus according to claim 3, comprising:
a range pressure switching valve that comprises forward travel range pressure output ports that output a forward travel range pressure while in the forward travel shift position or shift range and drain the forward travel range pressure in any other shift position or shift range, and reverse travel pressure output ports that output a reverse travel range pressure while in the reverse travel shift position or shift range and drain the reverse travel range pressure in any other shift position and/or shift range; wherein:
the second switching valve is connected to a first forward travel range pressure oil path that communicates the forward travel engagement oil path up to the hydraulic servo of the forward travel engaging element and the forward travel range pressure output ports while in the discharge position.

5. The hydraulic control apparatus according to claim 4, wherein:
the first and second switching valves are urged toward a discharge position side when the signal pressure of the first signal electromagnetic valve is input; and
the second switching valve is connected to a second forward travel range pressure oil path that supplies the forward travel range pressure so as to urge the second switching valve toward an engagement position side when changing from the non-travel shift position or shift range to the forward travel shift position or shift range.

6. The hydraulic control apparatus according to claim 5, comprising:
a delay device that is interposed on the first forward travel range pressure oil path and that delays the forward travel range pressure that is supplied from the first forward travel range pressure oil path to the second switching valve so as to be later than the forward travel range pressure that is supplied from the second forward travel range pressure oil path to the second switching valve.

7. The hydraulic control apparatus according to claim 6, comprising:
a third switching valve that is interposed on the second forward travel range pressure oil path and is connected to a third forward travel range pressure oil path that supplies the forward travel range pressure, switches to a communicating position that communicates the second forward travel range pressure oil path while in a non-travel shift position or shift range, inputs the forward travel range pressure from the third forward travel range pressure oil path while in the forward travel shift position or shift range, and switches to a blocking position that blocks the second forward travel range pressure oil path due to an urging of the forward travel range pressure from the third forward travel range pressure oil path after an engagement of the forward travel engaging element.

8. The hydraulic control apparatus according to claim 7, wherein the reverse travel engagement oil path is a first reverse travel range pressure oil path that supplies the reverse travel range pressure to the hydraulic servo of the reverse travel engaging element as the engagement pressure.

9. The hydraulic control apparatus according to claim 8, wherein the first switching valve is connected to a second reverse travel range pressure oil path that supplies the reverse travel range pressure so as to urge the first switching valve toward an engagement position side when changing from the non-travel shift position or shift range to the reverse travel shift position or shift range.

10. The hydraulic control apparatus according to claim 9, comprising:
a fourth switching valve that is interposed on the second reverse travel range pressure oil path and is connected to a third reverse travel range pressure oil path that supplies the reverse travel range pressure, switches to a communicating position that communicates the second reverse travel range pressure oil path when in the non-travel shift position or shift ranges, inputs the reverse travel range pressure from the third reverse travel range pressure oil path when in the reverse travel shift position or shift range, and switches to a blocking position that blocks the second reverse travel range pressure oil path due to an urging of the reverse travel range pressure from the third reverse travel range pressure oil path after an engagement of the reverse travel engaging element.

11. The hydraulic control apparatus according to claim 10, wherein:
the reverse travel engaging element comprises a reverse travel brake;
the automatic transmission comprises a reverse travel clutch that engages along with the reverse travel brake when in the reverse travel shift position or shift range, a second signal electromagnetic valve that outputs a signal pressure when changing from the non-travel shift position or shift range to the reverse travel shift position or shift range, and a second pressure regulating electromagnetic valve that can supply a regulated control pressure to the hydraulic servo of the reverse travel clutch; and
the fourth switching valve comprises a secure valve that is interposed between the second pressure regulating electromagnetic valve, a hydraulic servo of the reverse travel clutch, and the reverse travel range pressure output port of the range pressure switching valve, communicates the second pressure regulating electromagnetic valve and the hydraulic servo of the reverse travel clutch when in a communicating position, communicates the reverse travel range pressure output port of the range pressure switching valve and the hydraulic servo of the reverse travel clutch while in a blocking position, switches to the communicating position irrespective of the reverse travel range pressure from the third reverse travel range pressure oil path when the signal pressure of the second signal electromagnetic valve is input, switches to the blocking position by using the reverse travel range pressure from the third reverse travel range pressure oil path when the signal pressure of the second signal electromagnetic valve is not input, and supplies the reverse travel range pressure to the hydraulic servo of the reverse travel clutch even when the second pressure regulating electromagnetic valve is damaged.

12. A hybrid drive apparatus, comprising:
a hybrid drive unit that is structured such that a drive power from an internal combustion engine is distributed to a first motor and a drive shaft by a power distribution mechanism and a drive power of the second motor can be contributed to the drive shaft;
an automatic transmission that can shift a rotation of the drive shaft of the hybrid drive unit; and
a hydraulic control apparatus according to claim 11.

13. The hydraulic control apparatus according to claim 5, comprising:

a third switching valve that is interposed on the second forward travel range pressure oil path and is connected to a third forward travel range pressure oil path that supplies the forward travel range pressure, switches to a communicating position that communicates the second forward travel range pressure oil path while in a non-travel shift position or shift range, inputs the forward travel range pressure from the third forward travel range pressure oil path while in the forward travel shift position or shift range, and switches to a blocking position that blocks the second forward travel range pressure oil path due to an urging of the forward travel range pressure from the third forward travel range pressure oil path after an engagement of the forward travel engaging element.

14. The hydraulic control apparatus according to claim 5, wherein the reverse travel engagement oil path is a first reverse travel range pressure oil path that supplies the reverse travel range pressure to the hydraulic servo of the reverse travel engaging element as the engagement pressure.

15. The hydraulic control apparatus according to claim 14, wherein the first switching valve is connected to a second reverse travel range pressure oil path that supplies the reverse travel range pressure so as to urge the first switching valve toward an engagement position side when changing from the non-travel shift position or shift range to the reverse travel shift position or shift range.

16. The hydraulic control apparatus according to claim 15, comprising:
a third switching valve that is interposed on the second reverse travel range pressure oil path and is connected to a third reverse travel range pressure oil path that supplies the reverse travel range pressure, switches to a communicating position that communicates the second reverse travel range pressure oil path when in the non-travel shift position or shift ranges, inputs the reverse travel range pressure from the third reverse travel range pressure oil path when in the reverse travel shift position or shift range, and switches to a blocking position that blocks the second reverse travel range pressure oil path due to an urging of the reverse travel range pressure from the third reverse travel range pressure oil path after an engagement of the reverse travel engaging element.

17. The hydraulic control apparatus according to claim 16, wherein:
the reverse travel engaging element comprises a reverse travel brake;
the automatic transmission comprises a reverse travel clutch that engages along with the reverse travel brake when in the reverse travel shift position or shift range, a second signal electromagnetic valve that outputs a signal pressure when changing from the non-travel shift position or shift range to the reverse travel shift position or shift range, and a second pressure regulating electromagnetic valve that can supply a regulated control pressure to the hydraulic servo of the reverse travel clutch; and the third switching valve comprises a secure valve that is interposed between the second pressure regulating electromagnetic valve, a hydraulic servo of the reverse travel clutch, and the reverse travel range pressure output port of the range pressure switching valve, communicates the second pressure regulating electromagnetic valve and the hydraulic servo of the reverse travel clutch when in a communicating position, communicates the reverse travel range pressure output port of the range pressure switching valve and the hydraulic servo of the reverse travel clutch while in a blocking position, switches to the communicating position irrespective of the reverse travel range pressure from the third reverse travel range pressure oil path when the signal pressure of the second signal electromagnetic valve is input, switches to the blocking position by using the reverse travel range pressure from the third reverse travel range pressure oil path when the signal pressure of the second signal electromagnetic valve is not input, and supplies the reverse travel range pressure to the hydraulic servo of the reverse travel clutch even when the second pressure regulating electromagnetic valve is damaged.

18. A hybrid drive apparatus, comprising:
a hybrid drive unit that is structured such that a drive power from an internal combustion engine is distributed to a first motor and a drive shaft by a power distribution mechanism and a drive power of the second motor can be contributed to the drive shaft;
an automatic transmission that can shift a rotation of the drive shaft of the hybrid drive unit; and
a hydraulic control apparatus according to claim 17.

19. A hybrid drive apparatus, comprising:
a hybrid drive unit that is structured such that a drive power from an internal combustion engine is distributed to a first motor and a drive shaft by a power distribution mechanism and a drive power of the second motor can be contributed to the drive shaft;
an automatic transmission that can shift a rotation of the drive shaft of the hybrid drive unit; and
a hydraulic control apparatus according to claim 1.

* * * * *